United States Patent [19]

Funatsu

[11] Patent Number: 5,583,693
[45] Date of Patent: Dec. 10, 1996

[54] BINOCULAR

[75] Inventor: Gouji Funatsu, Tokyo, Japan

[73] Assignee: Asahi Kogaku Kogyo Kabushiki Kaisha, Tokyo, Japan

[21] Appl. No.: 466,134

[22] Filed: Jun. 6, 1995

Related U.S. Application Data

[62] Division of Ser. No. 997,452, Dec. 28, 1992.

[30] Foreign Application Priority Data

Dec. 26, 1991 [JP] Japan .................................. 3-357930
Dec. 26, 1991 [JP] Japan .................................. 3-357931
Feb. 27, 1992 [JP] Japan .................................. 4-018413
Mar. 21, 1992 [JP] Japan .................................. 4-23889

[51] Int. Cl.⁶ .................................................. G02B 23/00
[52] U.S. Cl. ........................... 359/425; 359/407; 359/410
[58] Field of Search ................................ 359/399–407, 359/410–425, 696–700

[56] References Cited

U.S. PATENT DOCUMENTS

| | | | |
|---|---|---|---|
| 4,171,865 | 10/1979 | Kamakura | 359/414 |
| 4,548,481 | 10/1985 | Yamada | 359/421 |
| 4,616,907 | 10/1986 | Nakamura | 359/414 |
| 4,630,901 | 12/1986 | Altenheiner et al. | 359/414 |
| 4,750,823 | 6/1988 | Riedl | 359/414 |
| 4,890,132 | 12/1989 | Hama | 354/400 |
| 4,952,041 | 8/1990 | Sandall | 359/422 |
| 5,062,698 | 11/1991 | Funathu | 359/414 |
| 5,071,242 | 12/1991 | Yanagisawa | 359/416 |
| 5,140,467 | 8/1992 | Hotta et al. | 359/696 |
| 5,191,471 | 3/1993 | Funathu | 359/414 |
| 5,196,959 | 3/1993 | Yanagisawa et al. | 359/415 |
| 5,212,591 | 5/1993 | Funathu | 359/407 |
| 5,235,458 | 8/1993 | Akagi et al. | 359/410 |
| 5,267,079 | 11/1993 | Riedl | 359/414 |
| 5,305,141 | 4/1994 | Yanagisawa et al. | 359/416 |
| 5,311,354 | 5/1994 | Kamiya et al. | 359/426 |

FOREIGN PATENT DOCUMENTS

| | | |
|---|---|---|
| 2406644 | 8/1975 | Germany . |
| 3114014 | 5/1991 | Japan . |
| 3264908 | 11/1991 | Japan . |

*Primary Examiner*—Thong Nguyen
*Attorney, Agent, or Firm*—Greenblum & Bernstein P.L.C.

[57] ABSTRACT

Telescopic optical systems of a binocular have respective objectives movable along respective optical axes for focusing on an object, and respective power-varying lens assemblies movable along respective optical axes for varying magnifications. One of the objectives is manually movable independent of the other objectives for diopter difference adjustment. The binocular has a manually operable mechanism for actuating the power-varying lens assemblies to adjust the magnifications independently of each other, to equalize the magnifications regardless of angular movement of the telescopic optical systems about the optical axes of the objectives for interpupillary adjustment. Electric motors for moving the objectives into an in-focus condition and moving the power-varying lens assemblies to vary the magnifications synchronously, are disposed on one side of a plane interconnecting the optical axes of the objectives. Batteries for energizing the electric motors are disposed on the other side of the plane.

16 Claims, 31 Drawing Sheets

BINOCULAR

This application is a division of application Ser. No. 07/997,452, filed Dec. 28, 1992, pending.

BACKGROUND OF THE INVENTION

Field of the Invention

The present invention is related to a binocular having parallel telescopic optical systems with focusing and power-varying mechanisms and mechanisms for interpupillary adjustment, diopter difference adjustment, and independent magnification adjustment.

Binoculars have parallel telescopic optical systems that are usually angularly movable to vary the distance between the eyepieces for interpupillary adjustment.

Generally, two telescopic optical systems are hinged to each other by a shaft for angular movement about respective optical axes that extend parallel to the shaft. When the telescopic optical systems are turned about the optical axes, they are moved toward or away from each other to bring the eyepieces to a suitable interpupillary distance for the user of the binocular.

According to a modern binocular design, the telescopic optical systems have respective Porro prisms as erector prismatic systems, respective objectives, and respective eyepieces whose optical axes are displaced out of alignment with those of the objectives. The telescopic optical systems are angularly movable about the optical axes of the objectives for interpupillary adjustment.

Binoculars are required to have some synchronizing mechanism for focusing the telescopic optical systems in ganged relationship to each other. Power-variable binoculars, or zoom-type binoculars, are also required to be equipped with a synchronizing mechanism for synchronously varying the magnifications of the telescopic optical systems. To vary the magnifications of the telescopic optical systems in synchronism with each other, the synchronizing mechanism moves power-varying lenses associated with eyepiece assemblies along respective optical axes to continuously vary the focal length of lenses ranging from objectives to eyepieces.

Since the telescopic optical systems are angularly movable for interpupillary adjustment, as described above, the synchronizing mechanisms for adjusting the focus and varying the magnification should operate to synchronize the telescopic optical systems without inhibiting the angular movement of the telescopic optical systems for interpupillary adjustment. To meet such a requirement, it has been customary for the synchronizing mechanisms to have a rather complex structure especially for use in binoculars whose telescopic optical systems have respective eyepieces whose optical axes are displaced out of alignment with those of the objectives because the eyepieces are turned about the optical axes of the objectives.

As a consequence, the synchronizing mechanisms are relatively large in size, resulting in a large binocular size. The user of the binocular is required to exert large manual forces to actuate the synchronizing mechanisms.

Motor-driven binoculars which electrically actuate the synchronizing mechanisms are also large in size since they require motors and batteries.

Binoculars with parallel telescopic optical systems generally have a focusing mechanism for moving both eyepieces simultaneously along their optical axes, and a diopter difference adjusting mechanism for moving one of the eyepieces independently of the other eyepiece. The diopter difference adjusting mechanism is used to compensate for vision errors of the user. After the diopter difference is eliminated using the diopter difference adjusting mechanism, the telescopic optical systems are brought into an in-focus condition by the focusing mechanism.

According to the modern binocular configuration with the telescopic optical systems being angularly movable about the optical axes of the objectives for interpupillary adjustment, a focusing mechanism is associated with the objectives for the reason that the interaxial distance between the objectives remains unchanged regardless of the interpupillary adjustment. However, since a diopter difference adjusting mechanism is still coupled to one of the eyepieces, that eyepiece must be movable only for the purpose of diopter difference adjustment. The binocular structure is relatively complex and costly because of the diopter difference adjusting mechanism.

The magnifications, or powers, of the telescopic optical systems of power-variable binoculars must be equalized to each other at all times. For equalizing the magnifications of the telescopic optical systems, it is necessary to adjust them with respect to each other. Inasmuch as the power-variable binoculars have a synchronizing mechanism for synchronously varying the magnifications of the telescopic optical systems, however, it is impossible to adjust the magnifications independently of each other. Heretofore, the magnifications of the respective telescopic optical systems must be adjusted independently before the synchronizing mechanism is assembled or after the assembled synchronizing mechanism is disassembled. Accordingly, the conventional independent magnification adjustment process has been tedious and time-consuming.

SUMMARY OF THE INVENTION

It is therefore an object of the present invention to provide a motor-driven binocular which is relatively small in size and can be controlled with relatively small forces.

Another object of the present invention is to provide a binocular having a diopter difference adjusting mechanism combined with a focusing mechanism.

Still another object of the present invention is to provide a binocular having a mechanism for synchronously varying magnifications of a pair of telescopic optical systems; while allowing the telescopic optical systems to move toward and away from each other for interpupillary adjustment.

Yet still another object of the present invention is to provide a binocular having a mechanism for adjusting magnifications of a pair of telescopic optical systems independently of each other.

According to an aspect of the present invention, a binocular comprising a pair of parallel telescopic optical systems is provided, intermeshing gear means mounted on the telescopic optical systems, for allowing the telescopic optical systems to be synchronously angularly moved about respective optical axes for interpupillary adjustment, electrically operated magnification control means positioned on one side of a plane interconnecting the optical axes, for electrically controlling the telescopic optical systems to vary magnifications thereof in synchronism with each other, and battery means positioned on the other side of the plane, for energizing the electrically operated magnification control means.

According to another aspect of the present invention, there is provided a binocular comprising a pair of parallel telescopes, intermeshing gear means for angularly moving the telescopes about respective optical axes in synchronism with each other for interpupillary adjustment, an electric power supply disposed between the telescopes on one side of a plane extending through the optical axes, an electric motor energizable by the electric power supply, the electric motor being disposed between the telescopes on the other side of the plane, and transmitting means for transmitting rotational forces from the electric motor to the telescopes to actuate the telescopes for varying magnifications thereof synchronously with each other, the transmitting means including a pair of universal joints aligned with the optical axes, respectively.

According to yet another aspect of the present invention, there is provided a binocular comprising a pair of parallel magnification-variable telescopes, and an electrically operated device for varying magnifications of the telescopes in synchronism with each other, the electrically operated device including an adjusting device for allowing the magnifications of the telescopes to be manually adjusted independently of each other.

According to yet still another aspect of the present invention, there is provided a binocular comprising a pair of parallel telescopic systems joined to each other for angular movement about respective optical axes for interpupillary adjustment, a motor-driven focusing mechanism for focusing the telescopic systems, the motor driven focusing mechanism being positioned near an objective side of the telescopic systems on one side of a plane interconnecting the optical axes, a motor-driven power varying mechanism for varying magnifications of the telescopic systems synchronously with each other, the motor-driven power varying mechanism being positioned near an eyepiece side of the telescopic systems on the one side of the plane, and an electric power supply device disposed on the other side of the plane, for energizing the motor-driven focusing mechanism and the motor-driven power varying mechanism.

According to a yet still further aspect of the present invention, there is provided a binocular comprising a pair of parallel telescopes hinged to each other for angular movement about respective optical axes for interpupillary adjustment, the telescopes including respective power varying lens assemblies, and manually operable control means for synchronously controlling the power-varying lens assemblies to vary magnifications of the telescopes irrespective of the angular movement of the telescopes about the optical axes for interpupillary adjustment.

According to another aspect of the present invention, there is provided a binocular comprising a pair of parallel telescopic systems having respective power-varying lens assemblies and respective eyepieces, intermeshing gear mechanisms on the telescopic systems for permitting the telescopic systems to be manually turned synchronously about respective optical axes for varying the distance between the eyepieces for interpupillary adjustment, and manually operable control means for synchronously controlling the power-varying lens assemblies to vary magnifications of the telescopes irrespective of the turning of the telescopic systems about the optical axes for interpupillary adjustment.

According to still another aspect of the present invention, a binocular is provided which includes a pair of parallel telescopic systems operatively coupled to each other for synchronous angular movement about respective optical axes for interpupillary adjustment, and a manually operable mechanism operatively coupled to the telescopic systems for varying magnifications thereof in synchronism with each other. The manually operable mechanism has a transmitting mechanism for transmitting manual forces to the telescopic systems to vary the magnifications thereof while allowing the telescopic systems to angularly move about the optical axes for interpupillary adjustment, the transmitting mechanism including a pair of universal joints aligned with the optical axes.

According to yet another aspect of the present invention, there is provided a binocular comprising a pair of parallel telescopes connected to each other and including respective power-varying lens assemblies, and a manually operable device for synchronously actuating the power-varying lens assemblies to vary magnifications of the telescopes in ganged relationship to each other, the manually operable device including an adjusting mechanism for allowing the power-varying lens assemblies to be manually adjusted independently of each other.

According to a further aspect of the present invention, there is provided a binocular comprising a pair of parallel hinged telescopic systems having respective lens barrels and respective power-varying lens assemblies movably supported in the lens barrels, respectively, a manually operable power varying mechanism operatively coupled between the telescopic systems for synchronously actuating the power-varying lens assemblies to vary magnifications of the telescopic systems in Synchronism with each other, and a screw mechanism in the manually operable power varying mechanism, for releasably fastening the power varying lens assemblies respectively to the lens barrels, the arrangement being such that when the screw mechanism is released, the power-varying lens assemblies can be moved in the lens barrels to adjust the magnifications of the telescopic systems independently of each other.

According to a still further aspect of the present invention, there is provided a binocular comprising a pair of parallel hinged telescopic systems having respective lens barrels and respective power-varying lens assemblies movably supported in the lens barrels, respectively. A manually operable power varying mechanism is operatively coupled between the telescopic systems for synchronously actuating the power-varying lens assemblies to vary magnifications of the telescopic systems in synchronism with each other, and a gear train device in the manually operable power varying mechanism for interruptibly transmitting manual forces to the power-varying lens assemblies, the arrangement being such that when the gear train device is interrupted, the power-varying lens assemblies can be manually moved in the lens barrels to adjust the magnifications of the telescopic systems independently of each other.

According to another aspect of the present invention, a binocular is provided which includes a pair of parallel telescopes connected to each other, respective power-varying lens assemblies, and an electrically operated mechanism for synchronously actuating the power-varying lens assemblies to vary magnifications of the telescopes in ganged relationship to each other. The electrically operated mechanism includes an adjusting device for allowing the power-varying lens assemblies to be manually adjusted independently of each other.

According to yet another aspect of the present invention, a binocular is provided which includes a pair of parallel hinged telescopic systems having respective lens barrels and respective power-varying lens assemblies movably supported in the respective lens barrels an electrically operated power varying mechanism operatively coupled between the telescopic systems for synchronously actuating the power-varying lens assemblies to vary magnifications of the telescopic systems in synchronism with each other, the electrically operated power varying mechanism including an electric motor and a gear train mechanism for interruptibly transmitting forces from the electric motor to the power-varying lens assemblies, the arrangement being such that when the gear train mechanism is interrupted, the power-varying lens assemblies can be manually moved in the lens barrels to adjust the magnifications of the telescopic systems independently of each other.

DESCRIPTION OF THE ACCOMPANYING DRAWINGS

Figure 18:
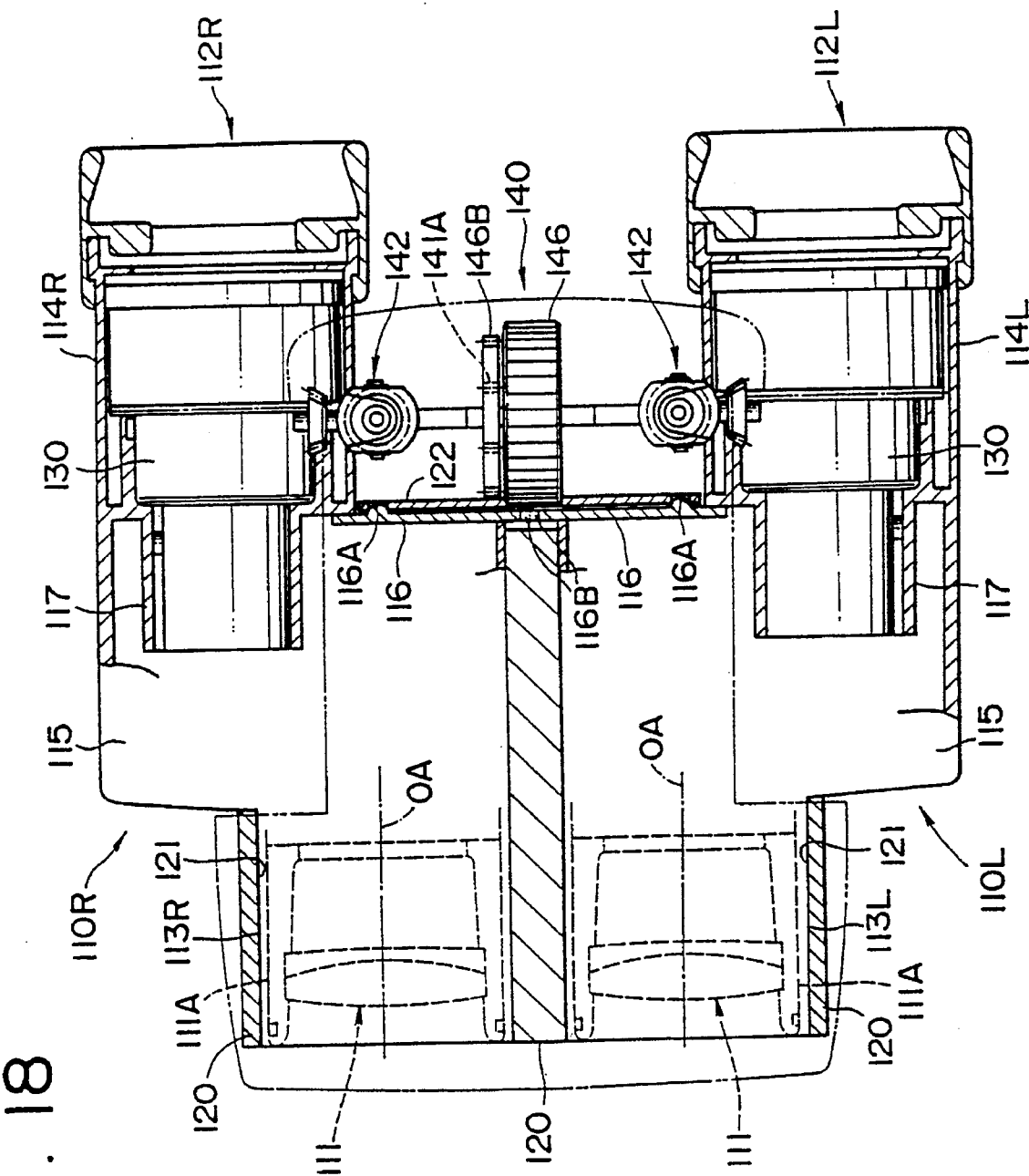
FIG. 18 is a fragmentary cross-sectional view of a binocular according to a second embodiment of the present invention.
Figure 24:
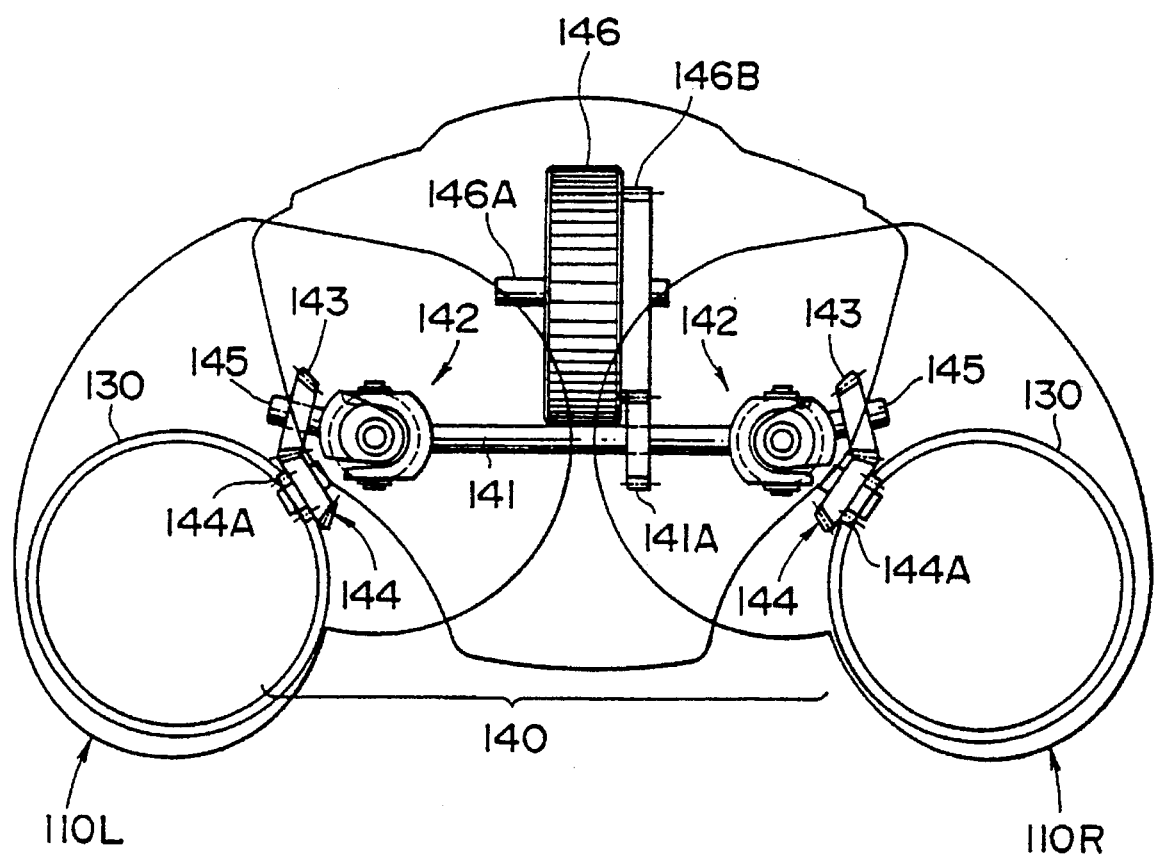
Figure 25:
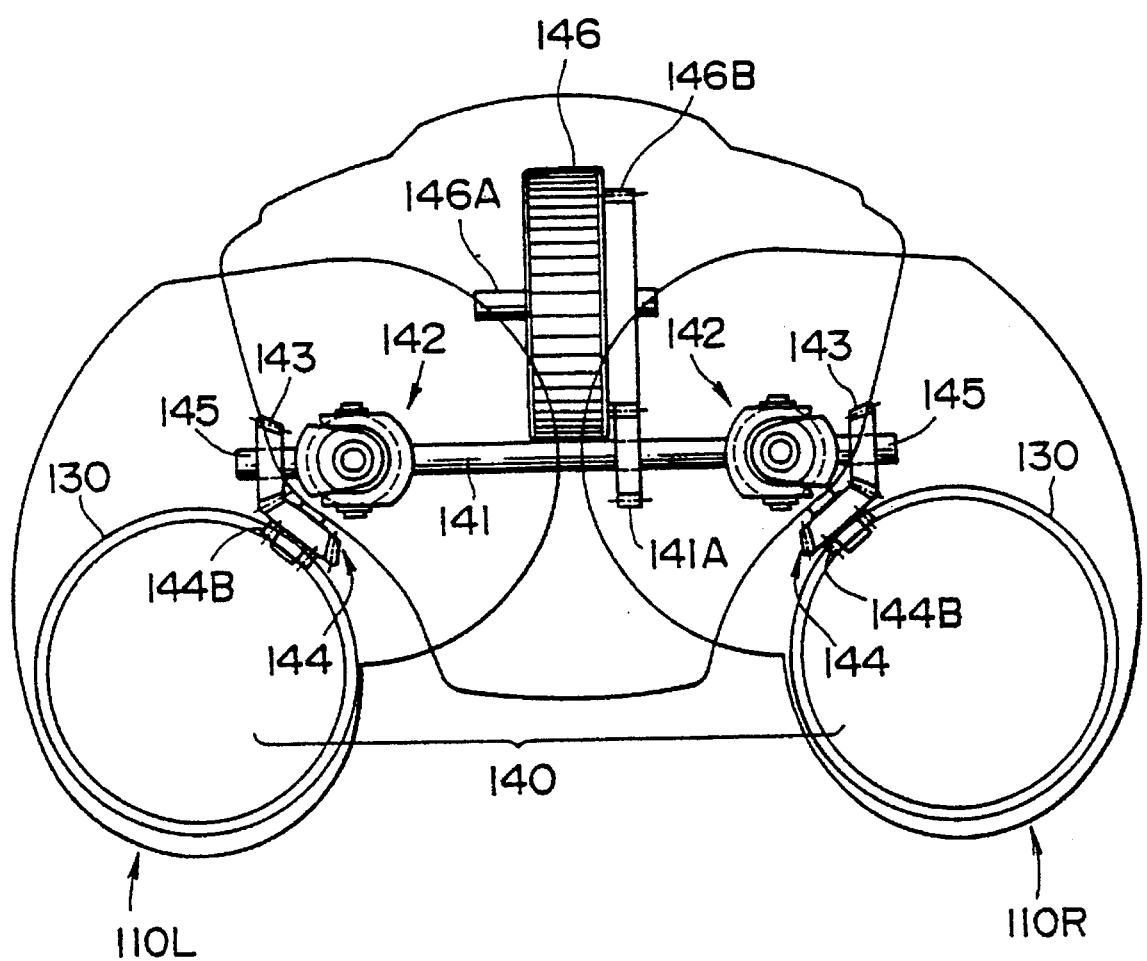
Figure 26:
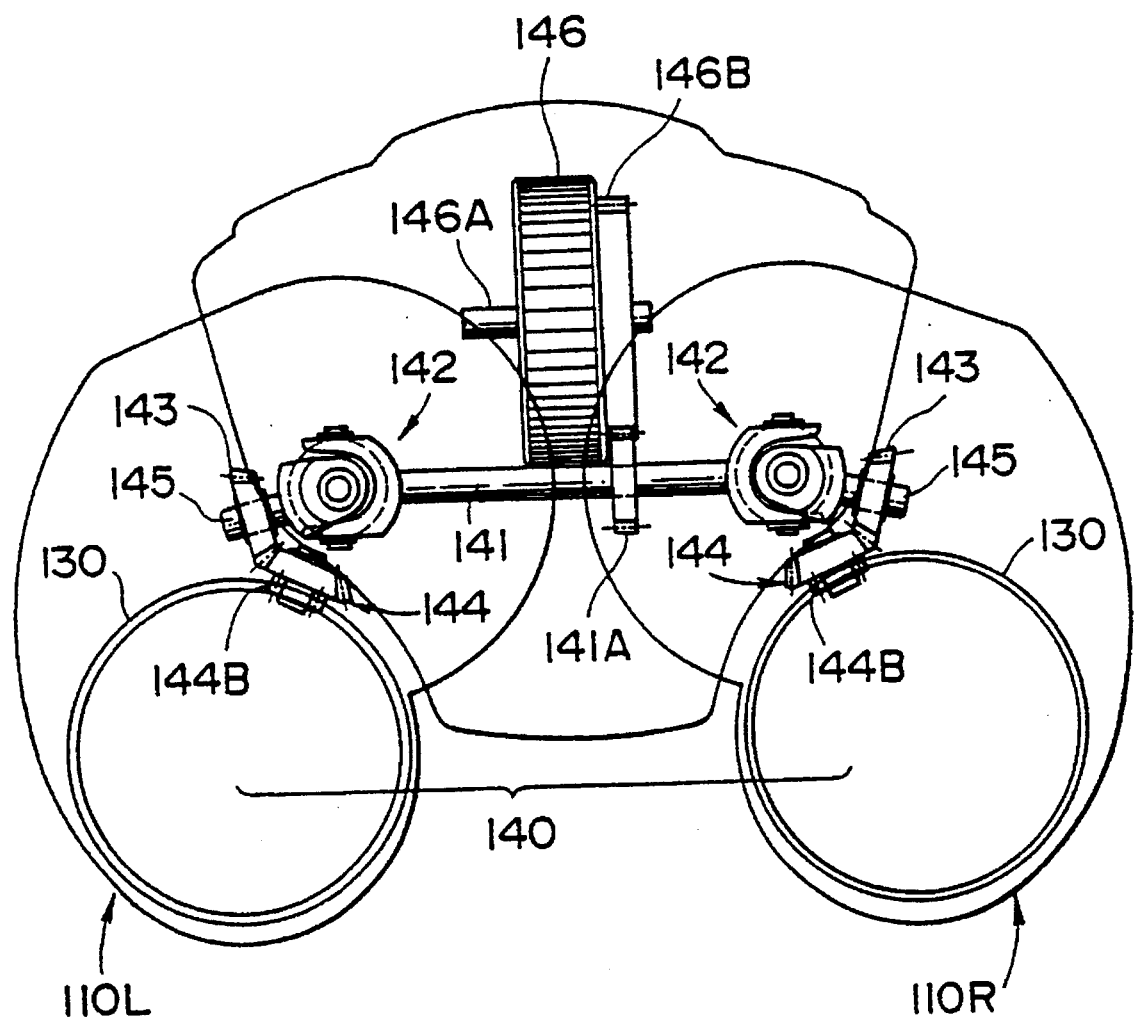
Figure 27:
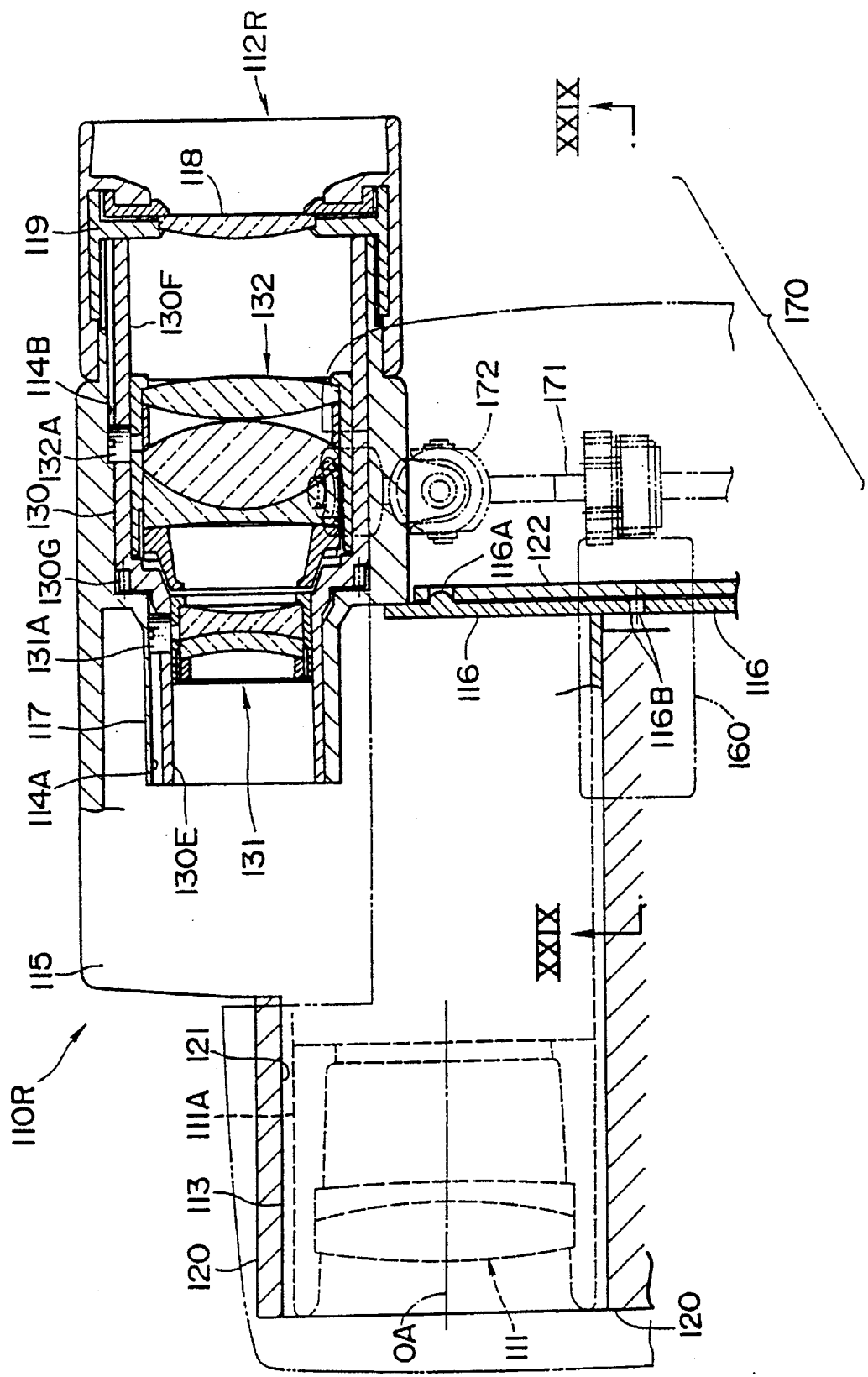
Figure 28:
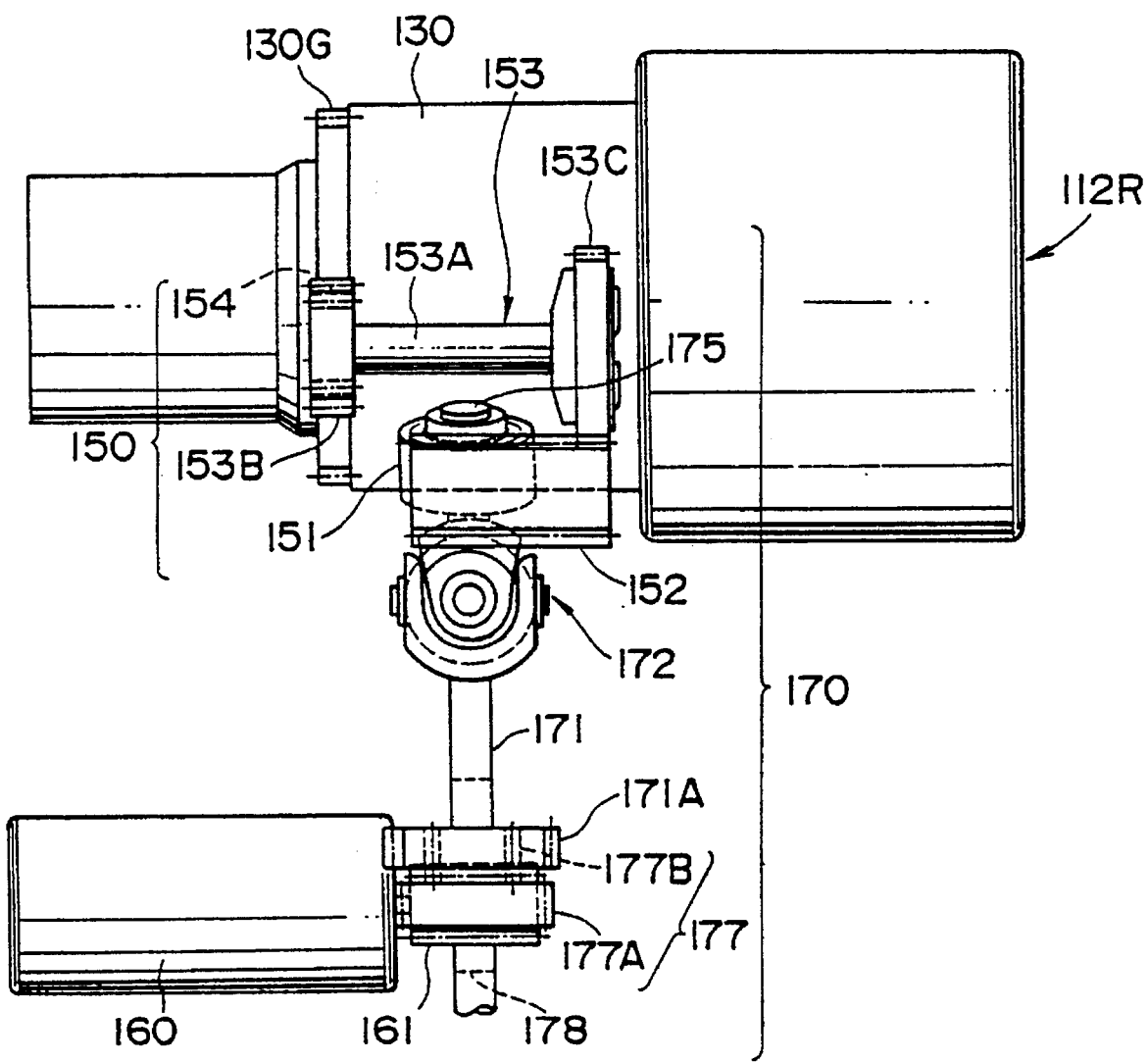
Figure 29:
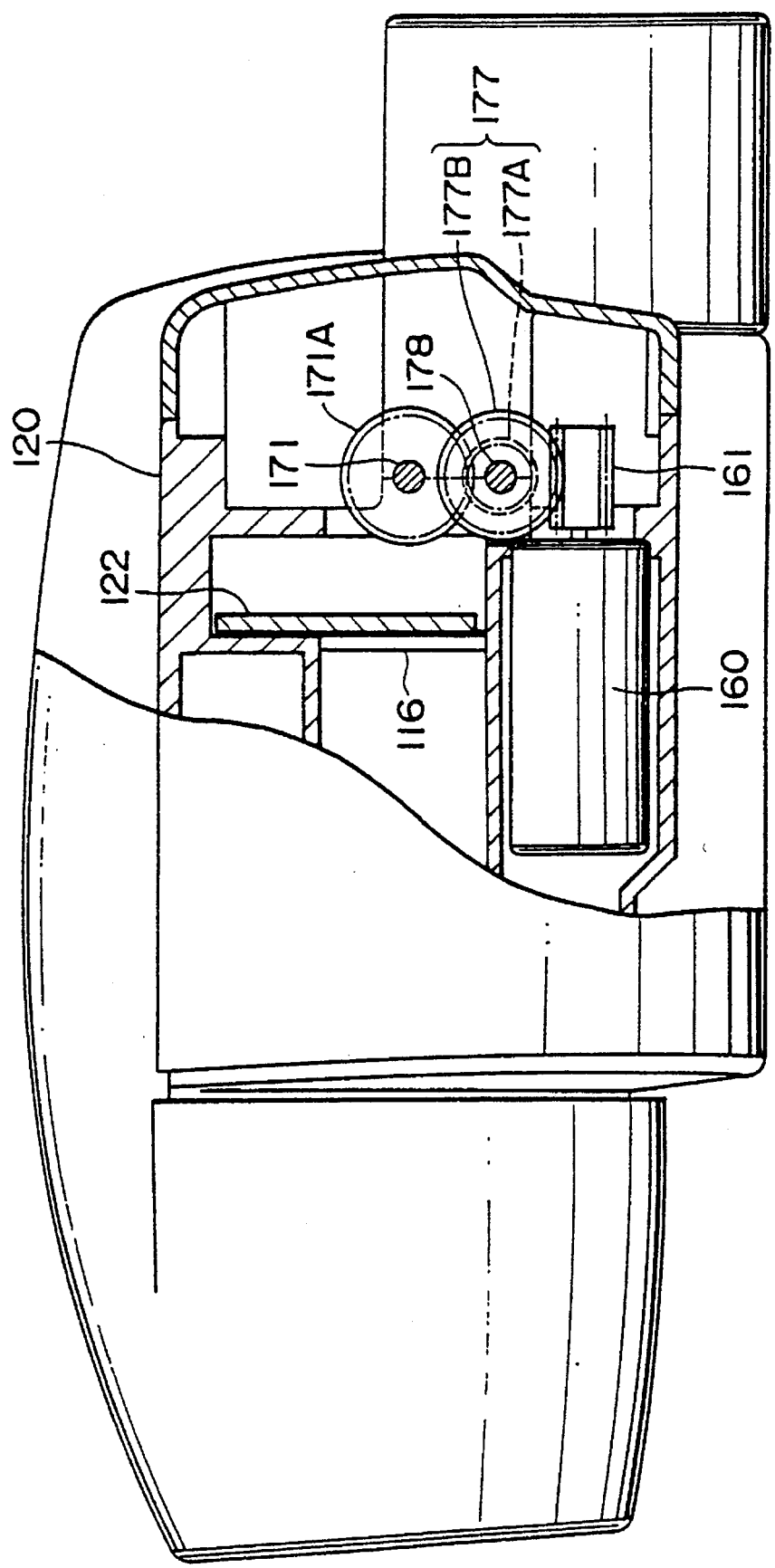
Figure 30A:
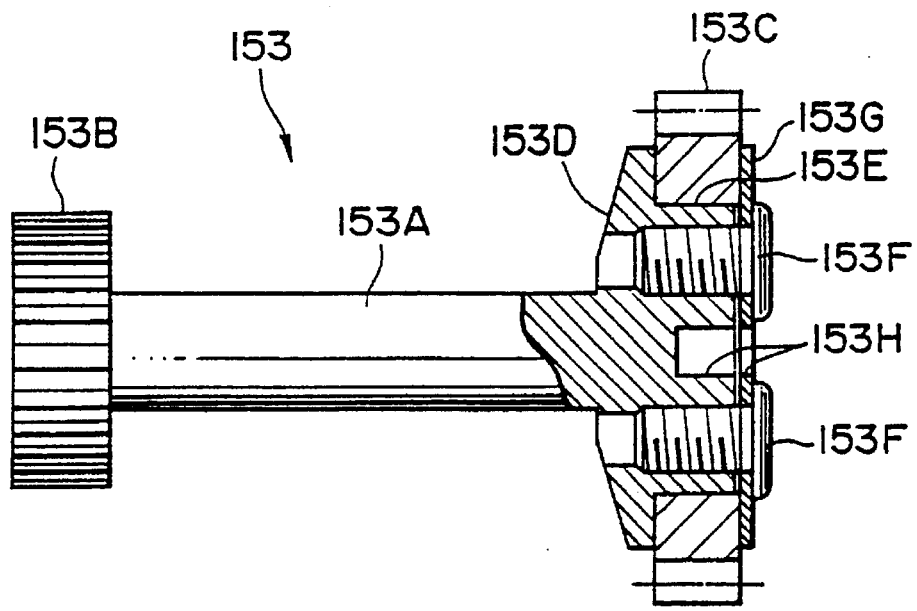
Figure 30B:
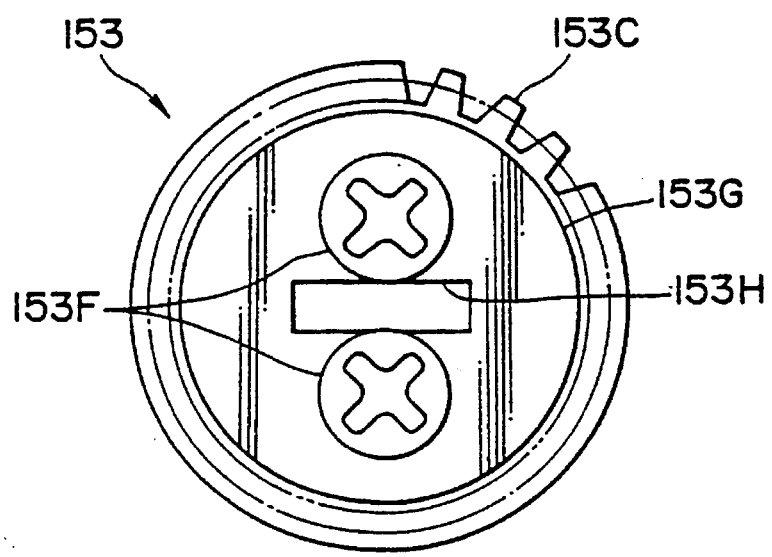
Figure 31:
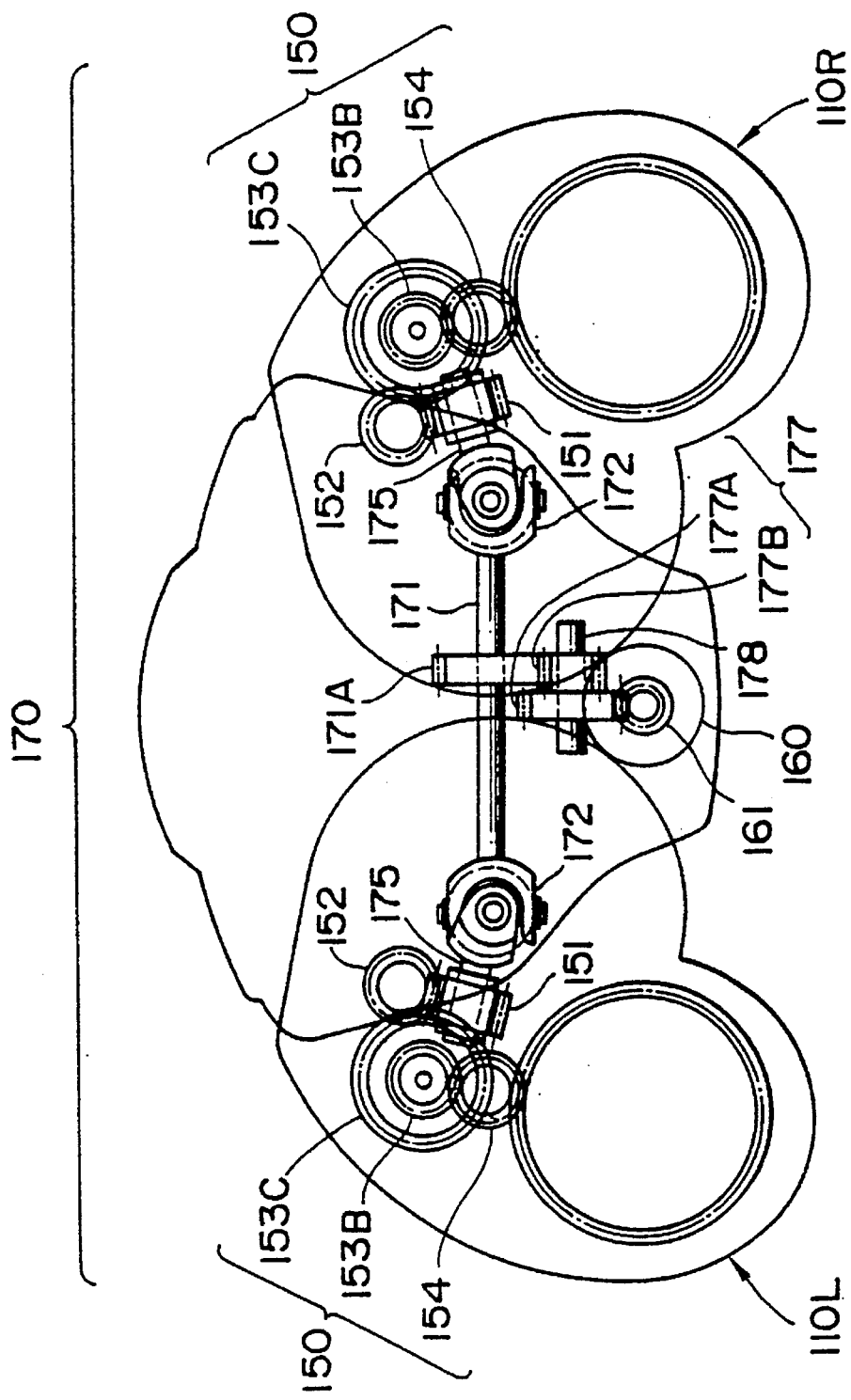
Figure 32:
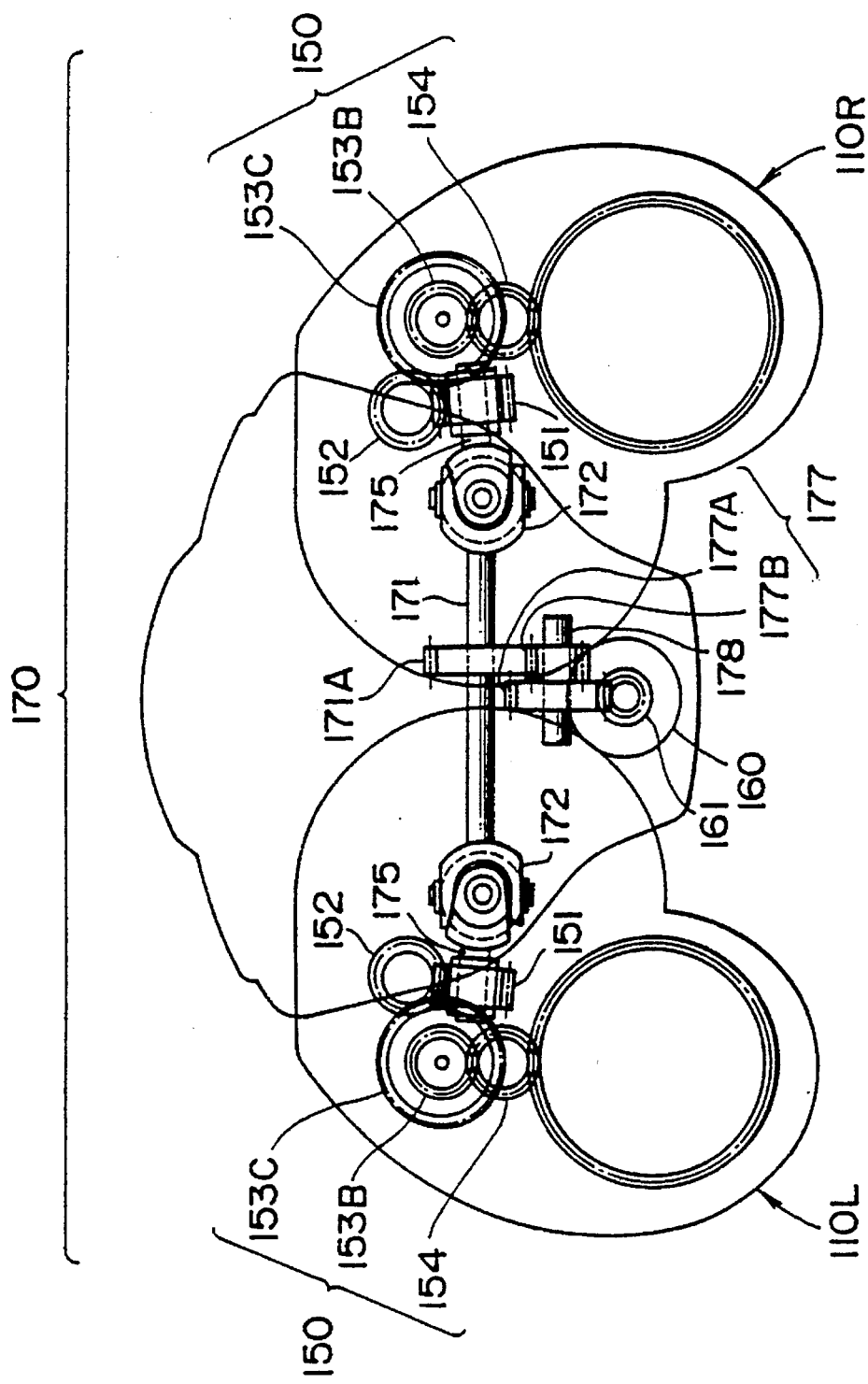
Figure 33:
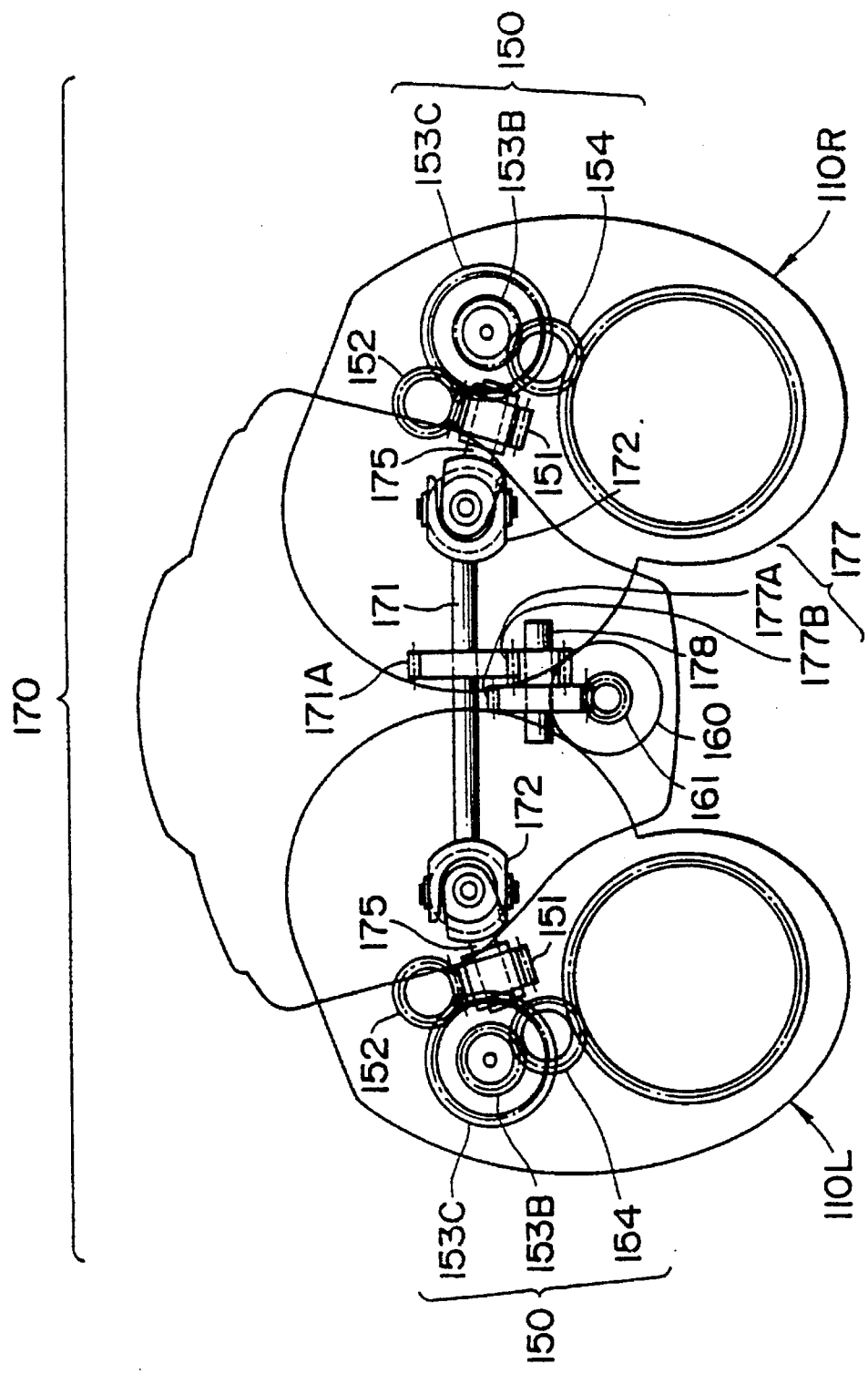

FIGS. 24, 25, and 26 are schematic elevational views showing a process of interpupillary adjustment for the binocular shown in FIG. 18;

FIG. 27 is an enlarged fragmentary cross-sectional view of an eyepiece assembly of a binocular according to a third embodiment of the present invention, with a power varying lens barrel which houses lens systems;

FIG. 28 is a plan view of a synchronous power varying mechanism in the binocular shown in FIG. 27;

FIG. 29 is a fragmentary cross-sectional view taken alone line XXIX—XXIX of FIG. 27;

FIG. 30A is an enlarged side elevational view, partly in cross section, of a clutch gear assembly of the synchronous power varying mechanism shown in FIG. 28;

FIG. 30B is an enlarged front elevational view of the clutch gear assembly shown in FIG. 30A; and FIGS. 31, 32, and 33 are schematic elevational views showing a process of interpupillary adjustment for the binocular shown in FIG. 27.

DESCRIPTION OF THE EMBODIMENTS

The principles of the present invention are particularly useful when embodied in a binocular with motor-driven or manually operable mechanisms for adjusting the focus and varying the magnifying power.

The suffixes "L" and "R" added to certain reference numerals in the description and the drawings are used to indicate various left and right binocular components, respectively, as recognized by the user of the binocular.

FIGS. 1 through 17A, 17B show a motor-driven focus-adjustable and power-variable binocular according to a first embodiment of the present invention.

Figure 1:
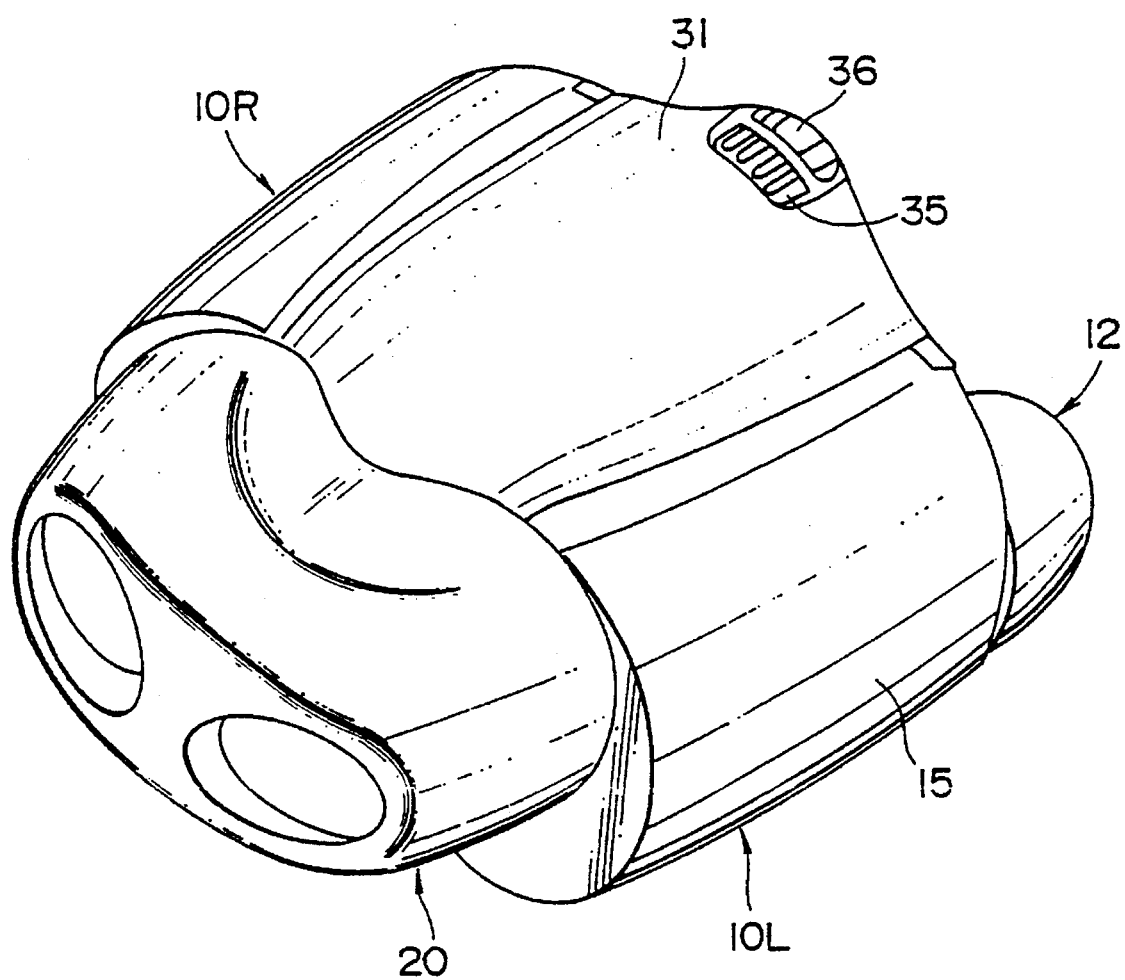
FIG. 1 is a perspective view of a binocular according to a first embodiment of the present invention.
Figure 2:
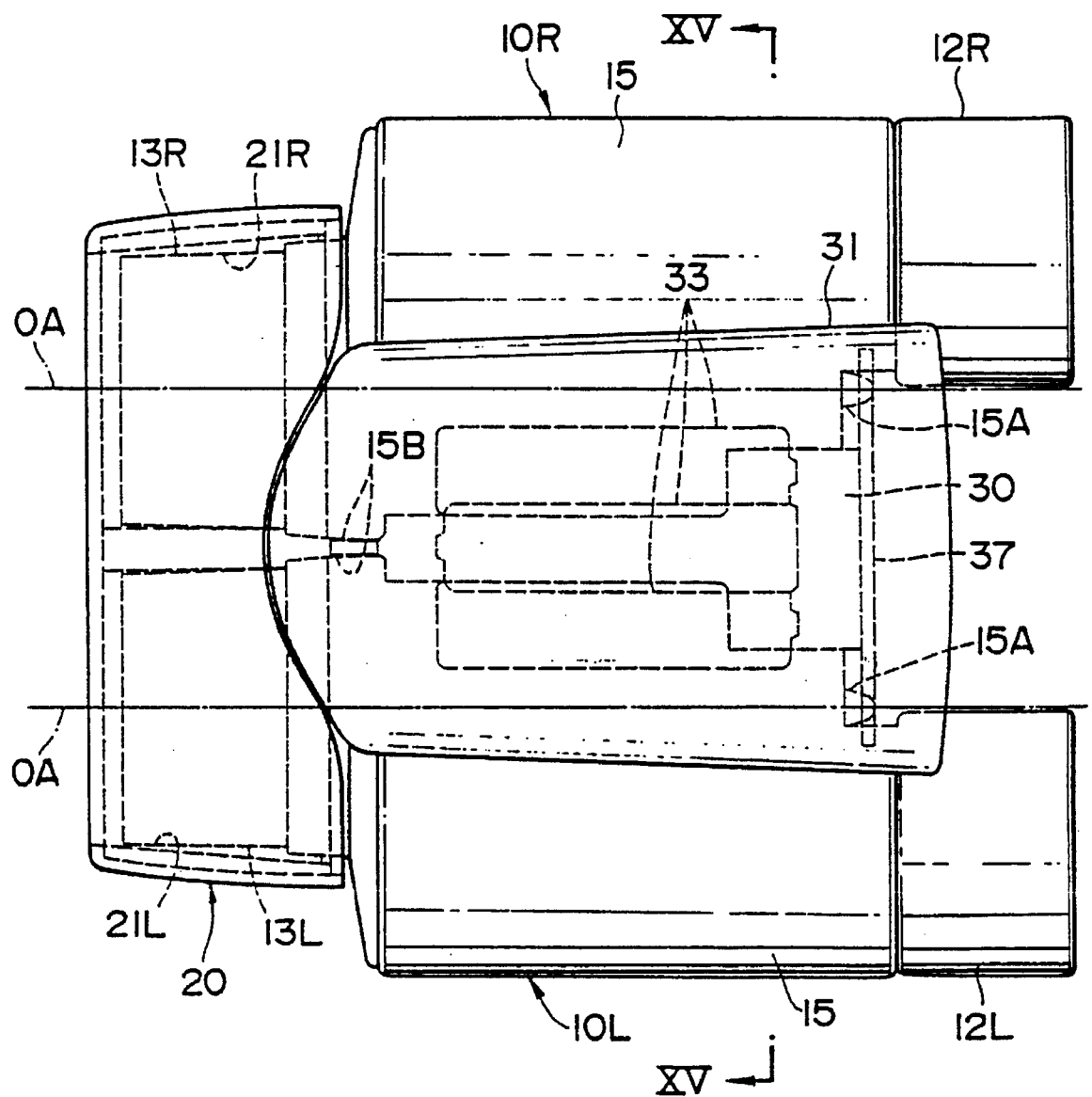
FIG. 2 is a plan view of the binocular shown in FIG. 1.

As shown in FIGS. 1 and 2, the binocular comprises a pair of left and right parallel telescopic optical systems 10L, 10R each comprising Porro prisms as an erecting prismatic system, an objective (not shown in FIGS. 1 and 2) having an optical axis OA, and an eyepiece assembly 12L or 12R whose optical axis is laterally displaced from, or eccentric with respect to, the optical axis OA. The binocular also has a joint retainer 20 which interconnects the objectives, a central support 30 connected to a rear surface of the joint retainer 20 and positioned between the telescopic optical systems 10L, 10R, and a holder plate 37 fixed to a rear surface of the central support 30. The telescopic optical systems 10L, 10R are spaced from each other and supported parallel to each other by the joint retainer 20, the central support 30, and the holder plate 37. As shown in FIG. 2, the optical axes of the eyepiece assemblies 12L, 12R are spaced a greater distance from each other than the optical axes OA are spaced from each other.

Figure 3:
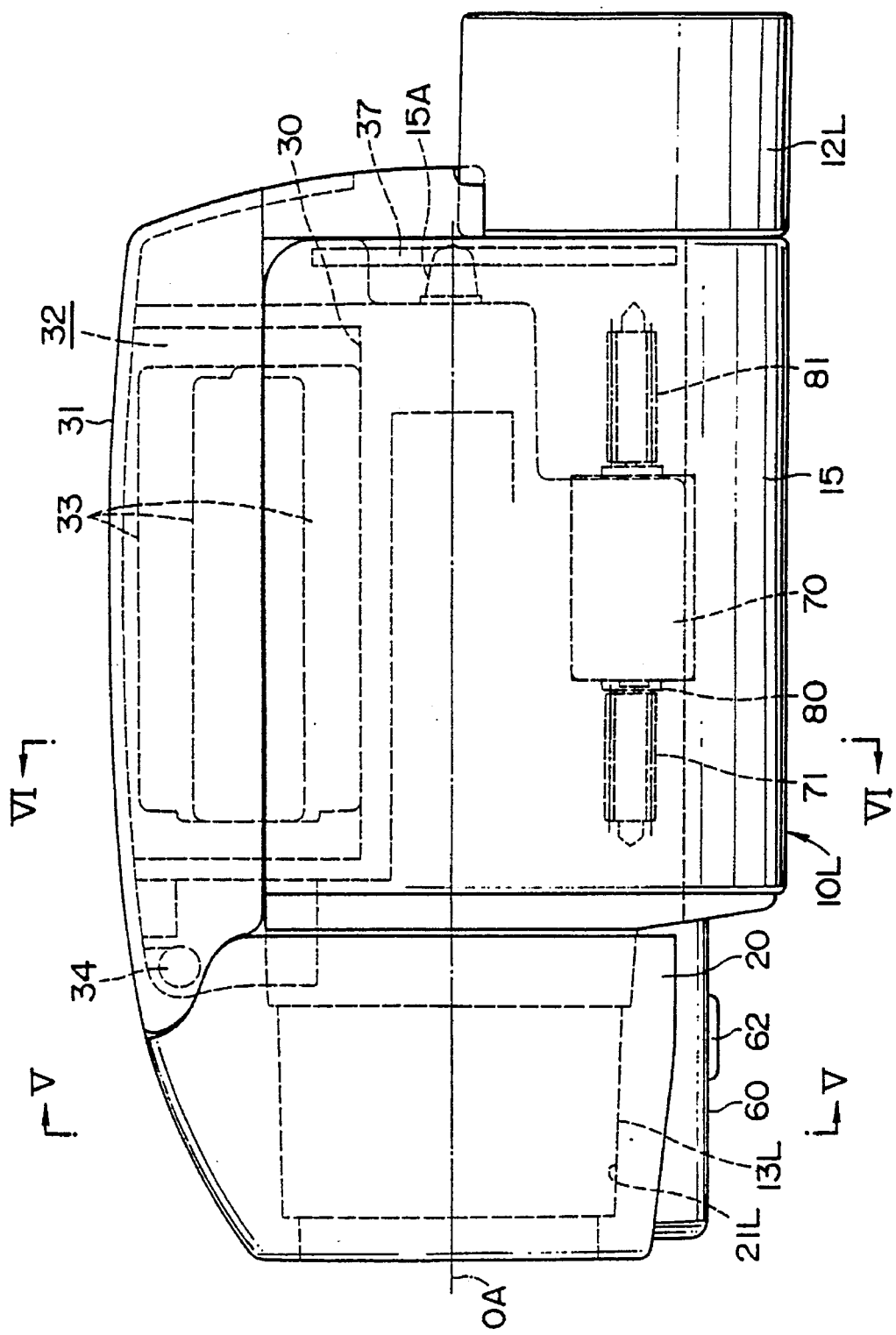
FIG. 3 is a side elevational view of the binocular shown in FIG. 1.
Figure 6:
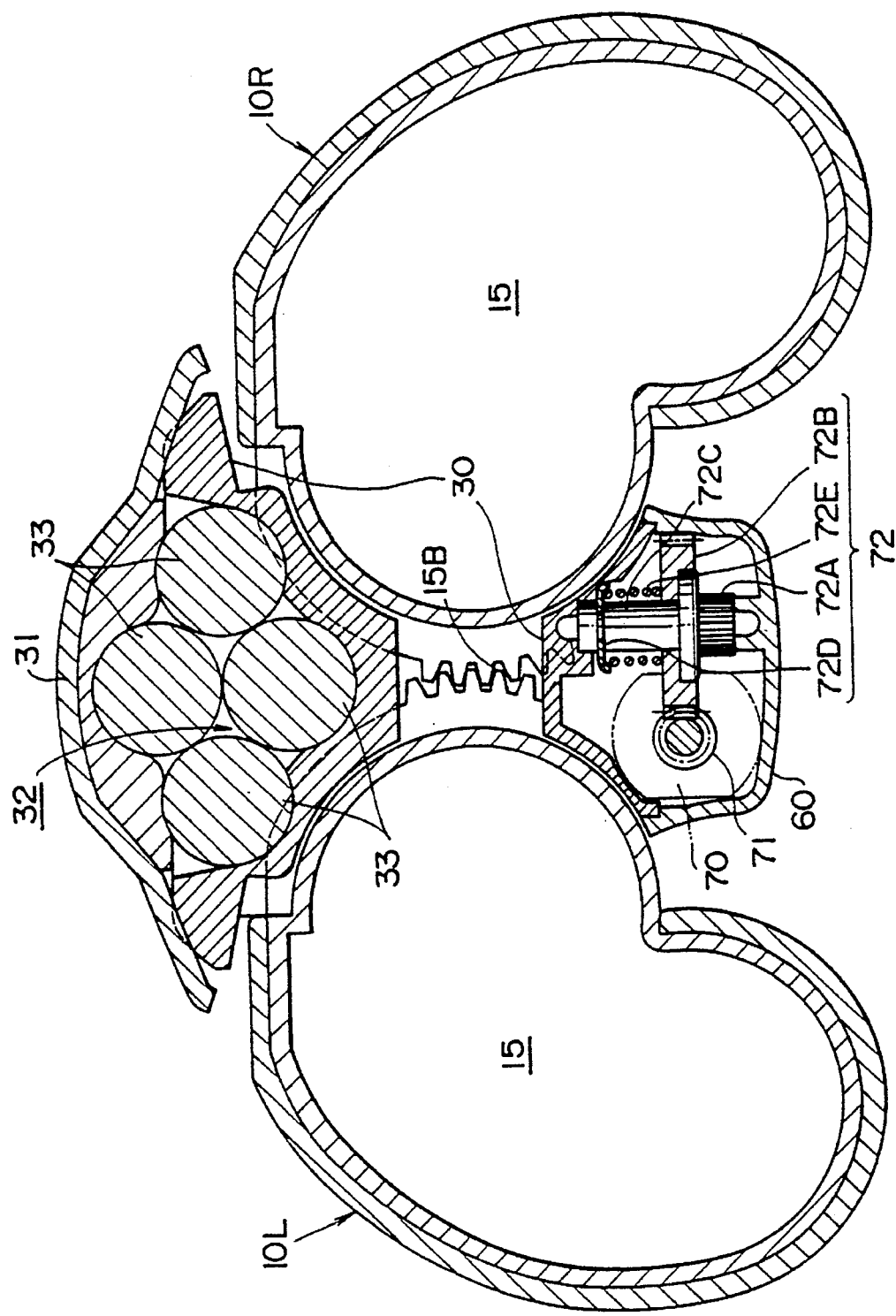
FIG. 6 is a cross-sectional view taken along line VI—VI of FIG. 3.
Figure 7:
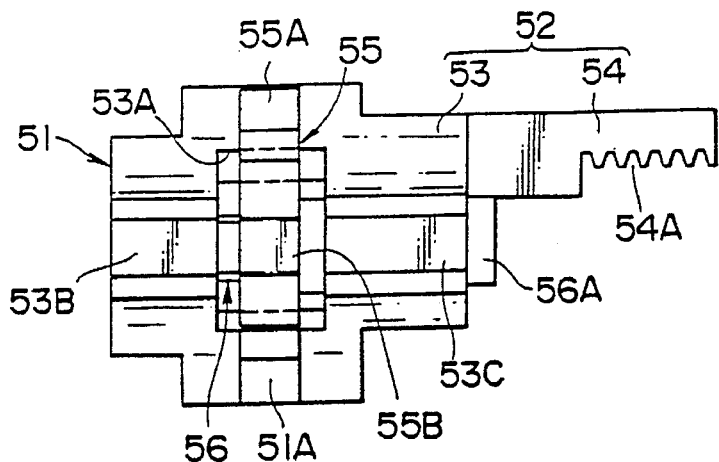
FIG. 7 is a plan view of a slider of a focusing mechanism of the binocular shown in FIG. 1.
Figure 8:
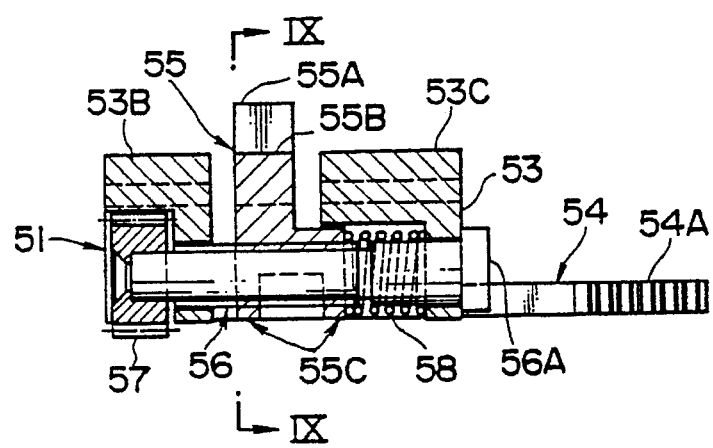
FIG. 8 is a longitudinal cross-sectional view of the slider shown in FIG. 7.
Figure 9:
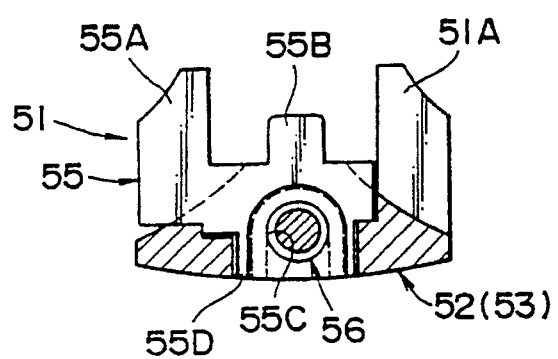
FIG. 9 is a cross-sectional view taken along line IX—IX of FIG. 8.

As also shown in FIG. 3, the central support 30 has an upwardly opening battery chamber 32 defined in an upper portion thereof. The battery chamber 32 houses four batteries 33 such that they extend parallel to the optical axes OA and jointly assume, in their cross section, substantially a lozenge shape as shown in FIG. 6. The upper opening of the battery chamber 32 is normally closed by an upper cover 31 which extends over the upper surface of the central support 30 and adjacent members. The upper cover 31 has a front end pivotally supported on the joint retainer 20 by a shaft 34.

The rear end of the upper cover 31, near the eyepiece assemblies 12L, 12R, can be selectively lifted and lowered to turn the upper cover 31 about the shaft 34 for opening and closing the battery chamber 32 for replacement of the batteries 33. The upper cover 31 supports, on its upper surface near the rear end thereof, a focus control switch 35 and a magnification, or power, control switch 36, as shown in FIG. 1.

Figure 4:
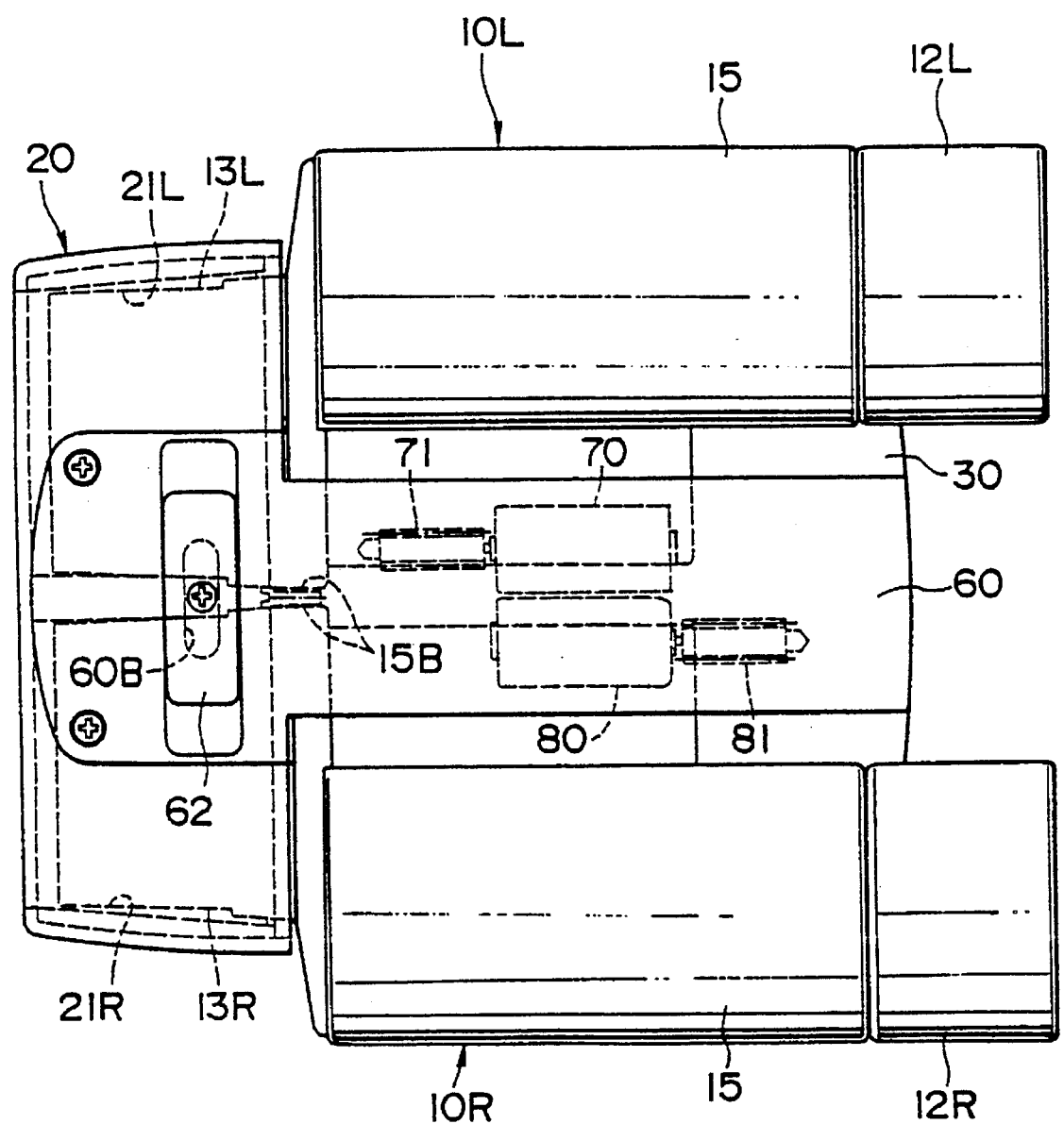
FIG. 4 is a bottom view of the binocular shown in FIG. 1.

As illustrated in FIGS. 2 and 4, the telescopic optical systems 10L, 10R have respective objective barrels 13L, 13R housing the respective objectives. The objective barrels 13L, 13R are coupled to the eyepiece assemblies 12L, 12R, respectively, through respective prism chambers 15 which accommodate the Porro prisms therein. The holder plate 37 is positioned between and secured to the prism chambers 15. The objective barrels 13L, 13R are rotatably fitted in respective parallel holes 21L, 21R defined in the joint retainer 20 in laterally spaced-apart relationship to each other.

As shown in FIGS. 2 and 3, the prism chambers 15 have substantially hemispherical projections 15A, respectively, on their rear ends near the eyepiece assemblies 12L, 12R, in alignment with the optical axes OA. The projections 15A are pressed and supported in place by the holder plate 37, but are allowed to rotate about the optical axes OA, respectively. Therefore, the telescopic optical systems 10L, 10R are angularly movable about the optical axes OA, respectively.

As shown in FIGS. 2, 4, 5, and 6, the prism chambers 15 have respective intermeshing sets of gear teeth 15B around front ends thereof remote from the projections 15A. The sets of gear teeth 15B are defined in certain angular intervals around the optical axes OA. The intermeshing engagement of the sets of gear teeth 15B allows the telescopic optical systems 10L, 10R to turn through equal angles about the respective optical axes OA in ganged relationship to each other thereby to vary the distance between the eyepiece assemblies 12L, 12R for interpupillary adjustment.

Figure 5:
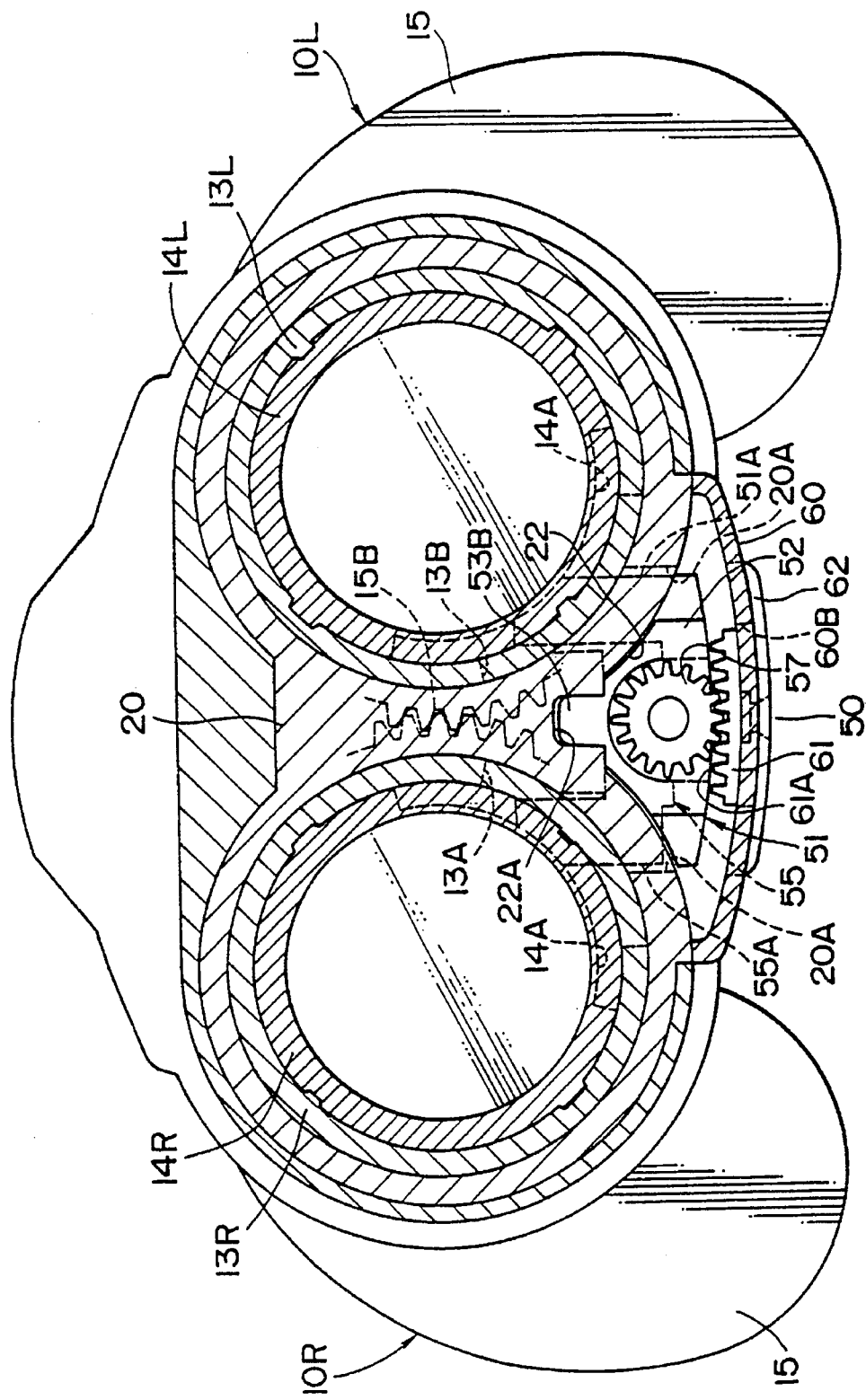
FIG. 5 is a cross-sectional view taken along line V—V of FIG. 3.
Figure 12:
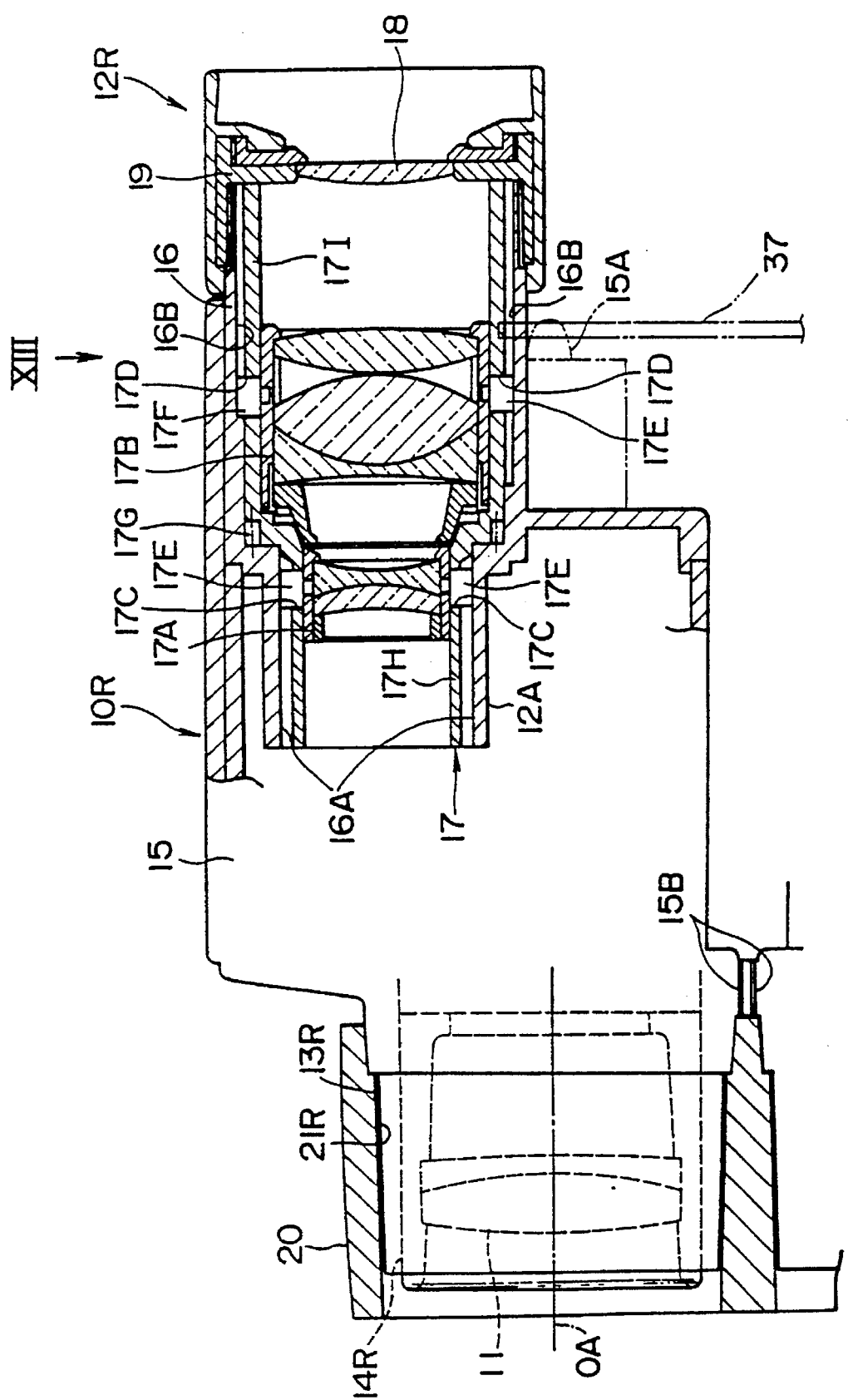
FIG. 12 is an enlarged fragmentary cross-sectional view of an eyepiece assembly of the binocular shown in FIG. 1, with a power-varying lens barrel which houses lens systems.
Figure 13:
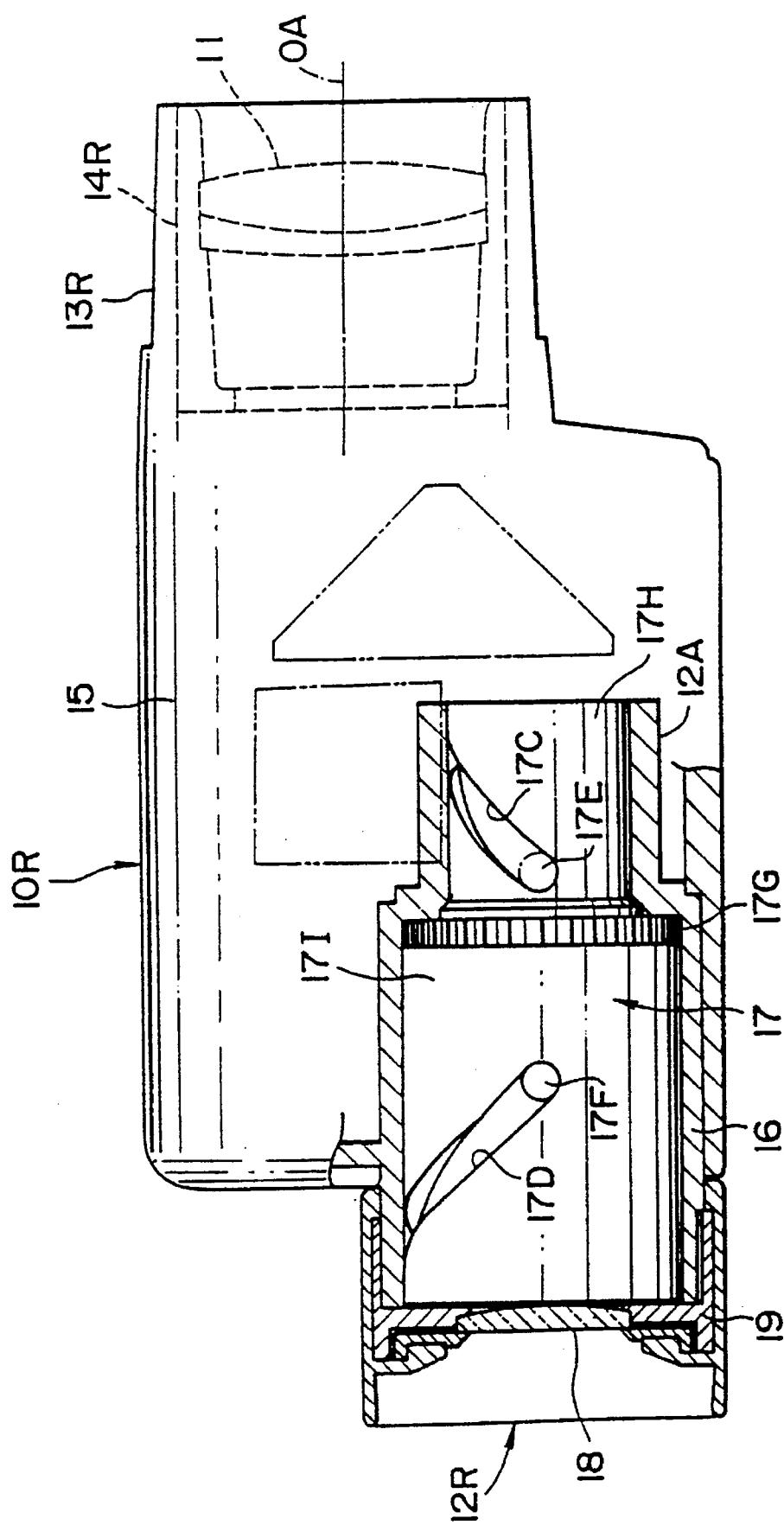
FIG. 13 is a side elevational view, partly in cross section, of a telescopic optical system as viewed in the direction indicated by the arrow XIII in FIG. 12.

Referring to FIG. 5, the objective barrels 13L, 13R accommodate therein respective lens frames 14L, 14R which hold the respective objectives (indicated by 11 in FIGS. 12 and 13). The lens frames 14L, 14R are axially movable a certain distance along the respective optical axes OA in the objective barrels 13L, 13R. When the lens frames 14L, 14R are moved along the optical axes OA, the telescopic optical systems 10L, 10R are adjusted to focus the image. Therefore, the objectives 11 serve as focus lenses.

The lens frames 14L, 14R and hence the objectives 11 are axially movable by a focusing mechanism 50 which is mounted in the joint retainer 20 centrally between and beneath the objective barrels 13L, 13R. As described later on, the focusing mechanism 50 includes a diopter difference adjusting mechanism for compensating for a diopter difference due to vision errors of the user. As shown in FIGS. 5, 7, 8, 9, and 10, the focusing mechanism 50 has a focusing slider 51 disposed in a recess 22 defined in the joint retainer 20 for movement over a certain distance along the optical axes OA. The focusing slider 51 can be moved along the optical axes OA by a focusing motor 70 (see FIGS. 3, 4, 10, and 11) that is located behind the slider 51 underneath the central support 30 below the batteries 33. The focusing motor 70 is electrically connected to the batteries 33 through the focus control switch 35. The lower side of the focusing slider 51 is covered with a lower cover 60 fixed to the lower surfaces of the joint retainer 20 and the central support 30.

The slider 51 comprises a slider body 52 having an integral control arm 51A projecting upwardly from one side thereof, and a movable member 55 having an integral control arm 55A projecting upwardly, the movable member 55 being movably supported on the slider body 52 for movement in directions along the optical axes OA. The control arm 51A extends through a hole 20A defined in the joint retainer 20 and a hole 13A defined in the objective barrel 13L, and engages in an arcuate groove 14A defined in the lens frame 14L. Similarly, the control arm 55A extends through a hole 20A defined in the joint retainer 20 and a hole 13A defined in thy objective barrel 13R, and engages in an arcuate groove 14A defined in the lens frame 14R.

The slider body 52 comprises a main block 53 having a vertical central through opening 53A defined therein, and a drive arm 54 extending rearwardly from one side of a rear end of the main block 53. The drive arm 54 has a rack 54A defined on an inner side thereof near its distal end. The main block 53 also has a pair of front and rear guide teeth 53B, 53C of rectangular cross section disposed centrally on its upper surface and positioned forwardly and rearwardly, respectively, of the opening 53A. The control arm 51A is mounted on the main block 53 on one side of the opening 53A. A feed screw 56 extends through the main block 53 below the guide teeth 53B, 53C across the opening 53A. The feed screw 56 has a flange 56A fixed to its rear end. A gear 57 is fixed to the front end of the feed screw 56 below the guide tooth 53B. The feed screw 56 is rotatable with respect to the main block 53, but axially immovable with respect thereto by the flange 56A and the gear 57.

The movable member 55 is movably disposed in the opening 53A in directions along the optical axes OA. The movable member 55 has a guide tooth 55B positioned between the guide teeth 53A, 53C. The movable control arm 55A of the movable member 55 is positioned on the other side of the opening 53A. The movable member 55 also has a lower support 55D slidably fitted in the opening 53A and having internally threaded surfaces 55C that are threaded over the feed screw 56, so that the movable member 55 is movable in the opening 53A along the feed screw 56. The movable member 55 is normally urged to move forwardly, i.e., toward the guide tooth 53B, by a compression coil spring 58 disposed around the feed screw 56 between a rear surface of the lower support 55D and an inner surface of the opening 53A which faces the lower support 55D. When the feed screw 56 is rotated about its own axis, the movable member 55 is moved in the opening 53A along the feed screw 56 between the guide teeth 53B, 53C. Consequently, when the feed screw 56 is rotated about its own axis, the control arm 55A is movable with respect to the control arm 51A parallel to the optical axes OA.

Figure 10:
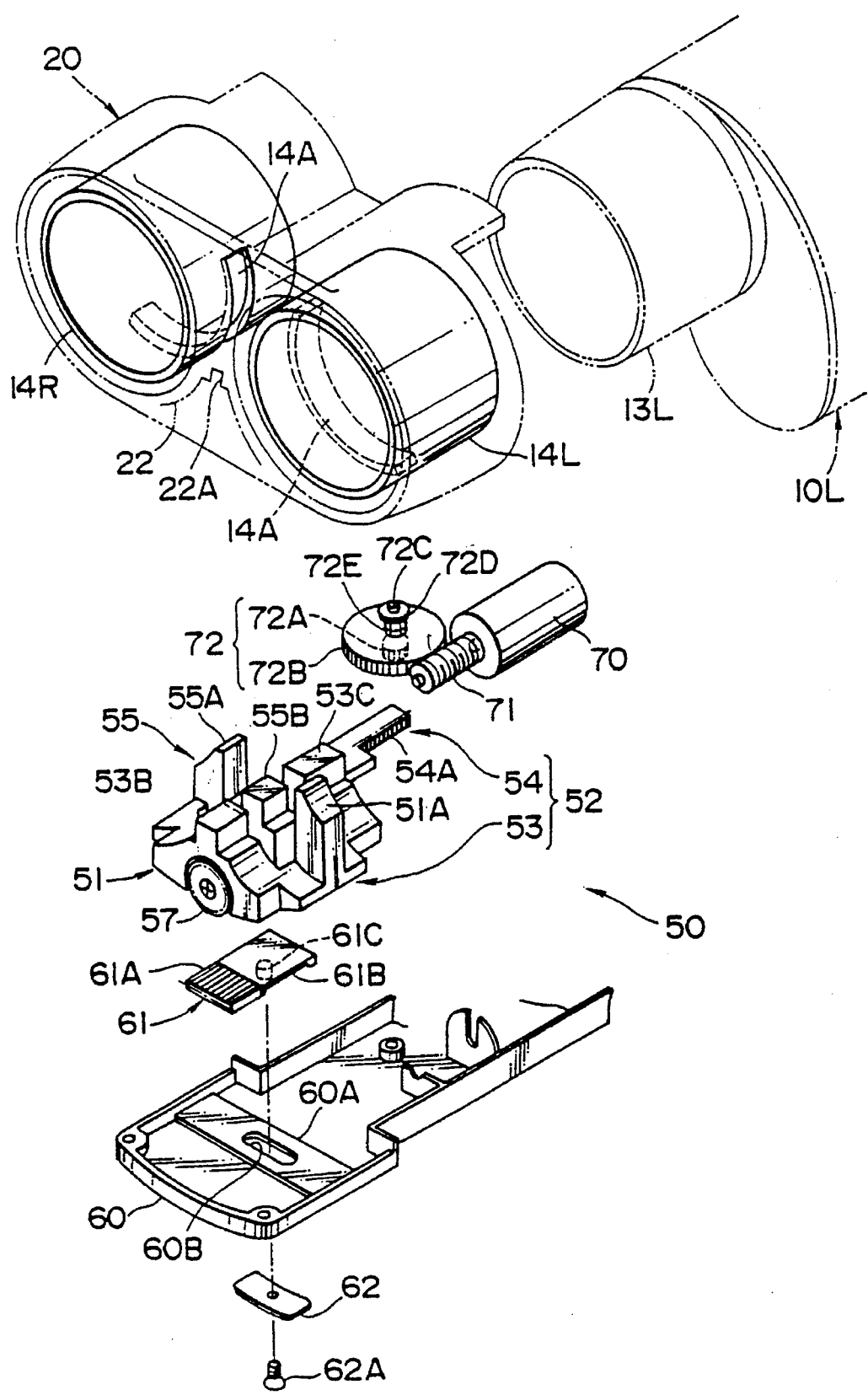
FIG. 10 is an exploded perspective view of the focusing mechanism.

As shown in FIGS. 5 and 10, the joint retainer 20 has a guide groove 22A defined centrally in the bottom of the recess 22 parallel to the optical axes OA. The guide teeth 53B, 53C of the slider body 52 and the guide tooth 55B of the movable member 55 are slidably fitted in the guide groove 22A. The slider body 52 and the movable member 55 are movable parallel to the optical axes OA as they are guided by the guide groove 22A.

A rack 61 is laterally movably disposed on the upper surface of the lower cover 60 for sliding movement traverse to the optical axes OA. The rack 61 has rack teeth 61A on its upper surface near the front end thereof, the rack teeth 61A meshing with the teeth 57 of the slider 51. As shown in FIG. 10, the rack 61 has a lateral recess 61B defined in a lower surface near the rear end thereof and slidably fitted over a guide plate 60A extending laterally on the upper surface of the lower cover 60. The rack 61 is therefore laterally movable along the guide plate 60A in directions across the optical axes OA. The guide plate 60A has a laterally elongate guide slot 60B defined centrally therein and extending through the lower cover 60. The rack 61 has a pin 61C positioned centrally in the recess 61B and projecting through the guide slot 60B to the lower surface of the lower cover 60. A control member 62 is fastened to the lower end of the pin 61C by a screw 62A. Therefore, when the user of the binocular manually moves the control member 62 laterally along the guide slot 60B, the user can move the rack 61 laterally to rotate the gear 57. The slider 51, the rack 61, the control member 62, the grooves 14A, and other associated components jointly make up the diopter difference adjusting mechanism.

Figure 11:
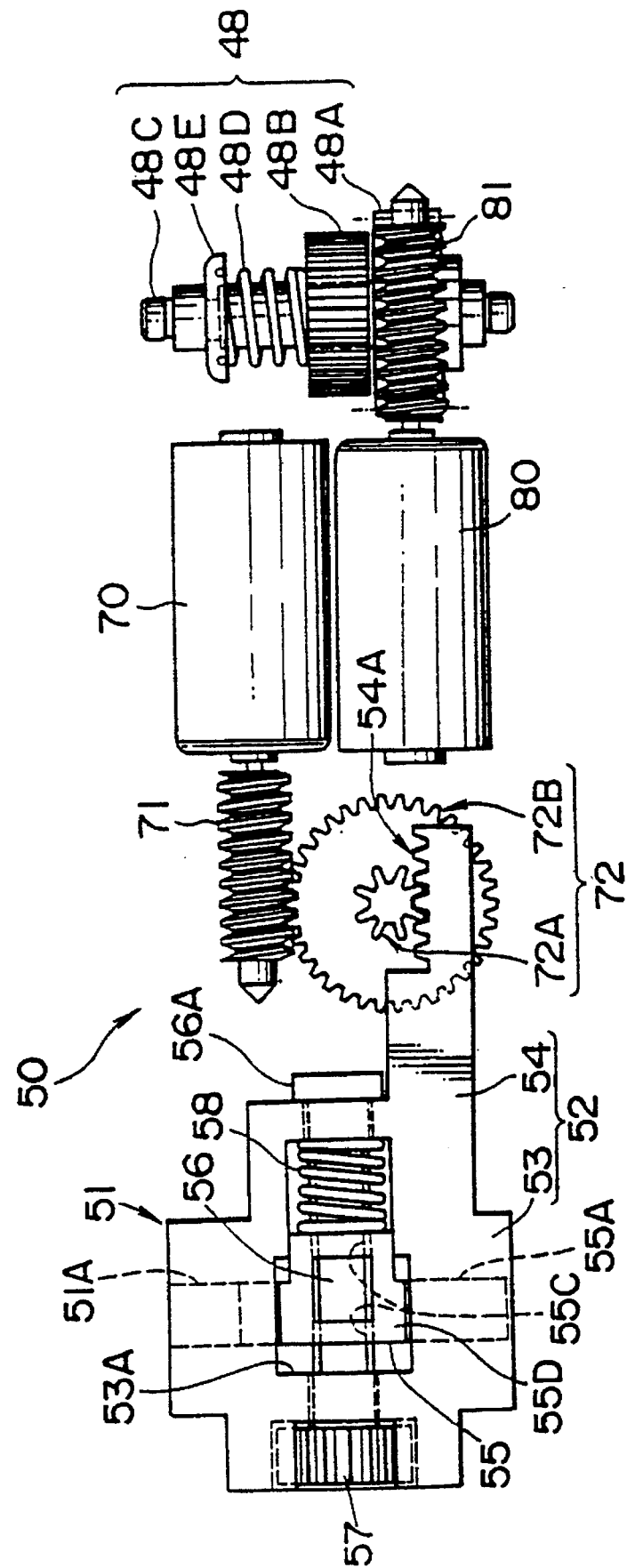
FIG. 11 is a bottom view of the focusing mechanism.

As illustrated in FIGS. 6, 10, and 11, a horizontal friction clutch gear assembly 72 is mounted on the upper surface of the lower cover 60 adjacent to the rack 54A of the drive arm 54 of the slider 51. The friction clutch gear assembly 72, which is rotatable about a vertical axis, comprises a lower smaller-diameter gear 72A meshing with the rack 54A and an upper larger-diameter worm wheel 72B meshing with a worm 71 fixedly mounted on the spindle of the focusing motor 70. The focusing motor 70 is disposed on the upper surface of the lower cover 60 beneath the central support 30, with the spindle thereof extending parallel to the optical axis OA toward the objectives 11.

Referring to FIG. 6, the friction clutch gear assembly 72 has a gear shaft 72C projecting integrally from the smaller-diameter gear 72A, and the larger-diameter worm wheel 72B is rotatably fitted over the gear shaft 72C coaxially with the smaller-diameter gear 72A. The gear shaft 72C extends between and is supported by the lower cover 60 and the central support 30. A compression coil spring 72E is disposed under compression between the worm wheel 72B and a retaining ring 72D mounted on the gear shaft 72C for normally urging the worm wheel 72B frictionally against the gear 72A. The worm wheel 72B and the gear 72A rotate in unison with each other due to friction therebetween, i.e., the torque produced by the focusing motor 70 is transmitted from the worm wheel 72B to the gear 72A, until reactive forces from the slider 51 reach a predetermined level. When the reactive forces from the slider 51 exceed the predetermined level, the worm wheel, 72B rotates idly with respect to the gear 72A in sliding contact therewith, i.e., no torque is transmitted from the worm wheel 72B to the gear 72A.

When the focusing motor 70 is energized upon pressing the focus control switch 35, the worm 71 is rotated to rotate the worm wheel 72B and the gear 72A, causing the rack 54A to move the slider 51 along the guide groove 22A, i.e., parallel to the optical axes OA. Since the control arms 51A, 55A engage the lens frames 14L, 14R, the lens frames 14L, 14R and hence the objectives 11 move in the objective barrels 13L, 13R to adjust the focus of the image formed by the objectives 11. When the lens frames 14L, 14R reach an end of the distance traversed thereby in the objective barrels 13L, 13R, reactive forces applied by the slider 51 to the gear 72A exceed the predetermined level, and the worm wheel 72B is rotated idly by the focusing motor 70. Therefore, no excessive forces are applied to the slider 51 and the lens frames 14L, 14R which are thus prevented from being damaged.

Any diopter difference, which may result from vision errors of the user, can be compensated for by the diopter difference adjusting mechanism as follows: The user manually moves the control member 62 underneath the lower cover 30 to move the rack 61 along the guide slot 60B to turn the gear 57 and hence the feed screw 56. The movable member 55 is moved along the feed screw 56 with respect to the slider body 52, and hence the control arm 55A is moved with respect to the control arm 51A, The objective 11 held by the lens frame 14R of the right telescopic optical system 10R moves along the optical axis OA with respect to the objective lens 11 held by the lens frame 14L of the left telescopic optical system 10L. Consequently, the diopter of the right telescopic optical system 10R can be adjusted with reference to the diopter of the left telescopic optical system 10L to compensate for visual correction required by the eyes of the user.

The diopter difference adjustment mechanism is incorporated in the focusing mechanism 50, i.e., the parts of the diopter difference adjustment mechanism are shared by the focusing mechanism 50. Therefore, the combination of the diopter difference adjustment mechanism and the focusing mechanism 50 may be comparatively simple in structure and small in size.

The binocular also has a synchronous power varying mechanism 40 (see FIGS. 14, 15, and 16) for varying the magnifications, or powers, of the telescopic optical systems 10L, 10R in ganged relationship to each other. The synchronous power-varying mechanism 40 will be described below.

As shown in FIGS. 12 and 13, the eyepiece assembly 12R includes an eyepiece barrel 16 extending into the prism chamber 15 of the telescopic optical system 10R and fixedly positioned therein. A power-varying lens barrel 17 is rotatably fitted in the eyepiece barrel 16 and has an outer end which is held by an eyepiece frame 19 supporting an eyepiece 18. The eyepiece frame 19 is fixed to the outer end of the eyepiece barrel 16. The eyepiece barrel 16 includes a smaller-diameter holder sleeve 12A disposed in the prism chamber 15 and extending toward the objective 11.

The power-varying lens barrel 17 is in the form of a double cylinder including a smaller-diameter cylindrical portion 17H extending toward the objective 11 and a larger-diameter cylindrical portion 17I having a spur gear 17G on its outer circumferential surface near the smaller-diameter cylindrical portion 17H. The power-varying lens barrel 17 houses a lens system 17A of negative power supported in the smaller-diameter cylindrical portion 17H and a lens system 17B supported in the larger-diameter cylindrical portion 17I. These lens systems 17A, 17B are axially movable respectively in the smaller- and larger-diameter cylindrical portions 17H, 17I for movement along the optical axis of the eyepiece 18.

The smaller-diameter cylindrical portion 17H has two diametrically opposite helical cam grooves 17C defined in its cylindrical wall which extend helically around the optical axis of the eyepiece 18. Likewise, the larger-diameter cylindrical portion 17I has two diametrically opposite helical cam grooves 17D defined in its cylindrical wall which extend helically around the optical axis of the eyepiece 18. The lens system 17A has a pair of diametrically opposite guide pins 17E mounted on its lens frame and extending radially outwardly through the respective cam grooves 17C into respective diametrically opposite axially straight guide grooves 16A defined in the inner circumferential surface of the holder sleeve 12A. The lens system 17B has a pair of diametrically opposite guide pins 17F mounted on its lens frame and extending radially outwardly through the respective cam grooves 17D into respective diametrically opposite axially straight guide grooves 16B defined in the inner circumferential surface of the eyepiece barrel 16. The cam grooves 17C, 17D and the guide grooves 16A, 16B are of such a size that they allow the guide pins 17E, 17F to move smoothly in these grooves 17C, 17D, 16A, 17B. Therefore, when the power-varying lens barrel 17 is rotated about its own axis, the guide pins 17E which engage in both the cam grooves 17C and the guide grooves 16A move along the optical axis of the eyepiece 18, thereby moving the lens system 17A axially in the smaller-diameter cylindrical portion 17H, and the guide pins 17F which engage in both the cam grooves 17D and the guide grooves 16B move along the optical axis of the eyepiece 18, thereby moving the lens system 17B axially in the larger-diameter cylindrical portion 17I.

More specifically, it is assumed that the lens systems 17A, 17B are initially positioned most closely to each other as shown in FIG. 12. Now, when the power-varying lens barrel 17 is rotated clockwise as viewed from the eyepiece 18, the lens system 17A is axially moved toward the objective 11, and the lens system 17B is axially moved toward the eyepiece 18 for continuously varying the magnification or power of the telescopic optical system 10R without shifting the formed image out of focus.

That is to say, the lens system 17A functions as a vari-focal lens assembly on the objective side, and the lens system 17B functions as a vari-focal lens assembly on the eyepiece side. Futhermore, the objective 11 and lens system 17A constitute the objective optical system and the lens system 17B and the eyepiece lens 18 constitute the eyepiece optical system. The other eyepiece assembly 12L of the telescopic optical system 10L, including an eyepiece barrel and a power-varying lens barrel with lens systems, is identical in structure to the eyepiece assembly 12R, and will not be described in detail.

It should be noted that the focusing is accomplished by the objectives 11 along the optical axes OA and the magnification of each of the telescopic optical systems 10L, 10R can be varied by changing the distance between the vari-focal lens assembly 17A on the objective side and the vari-focal lens assembly 17B on the eyepiece side. The magnifications of the telescopic optical systems 10L, 10R can be varied in synchronism with each other, i.e. the power-varying lens barrels 17 therefore can be rotated in ganged relationship to each other, by the synchronous power-varying mechanism 40.

Figure 14:
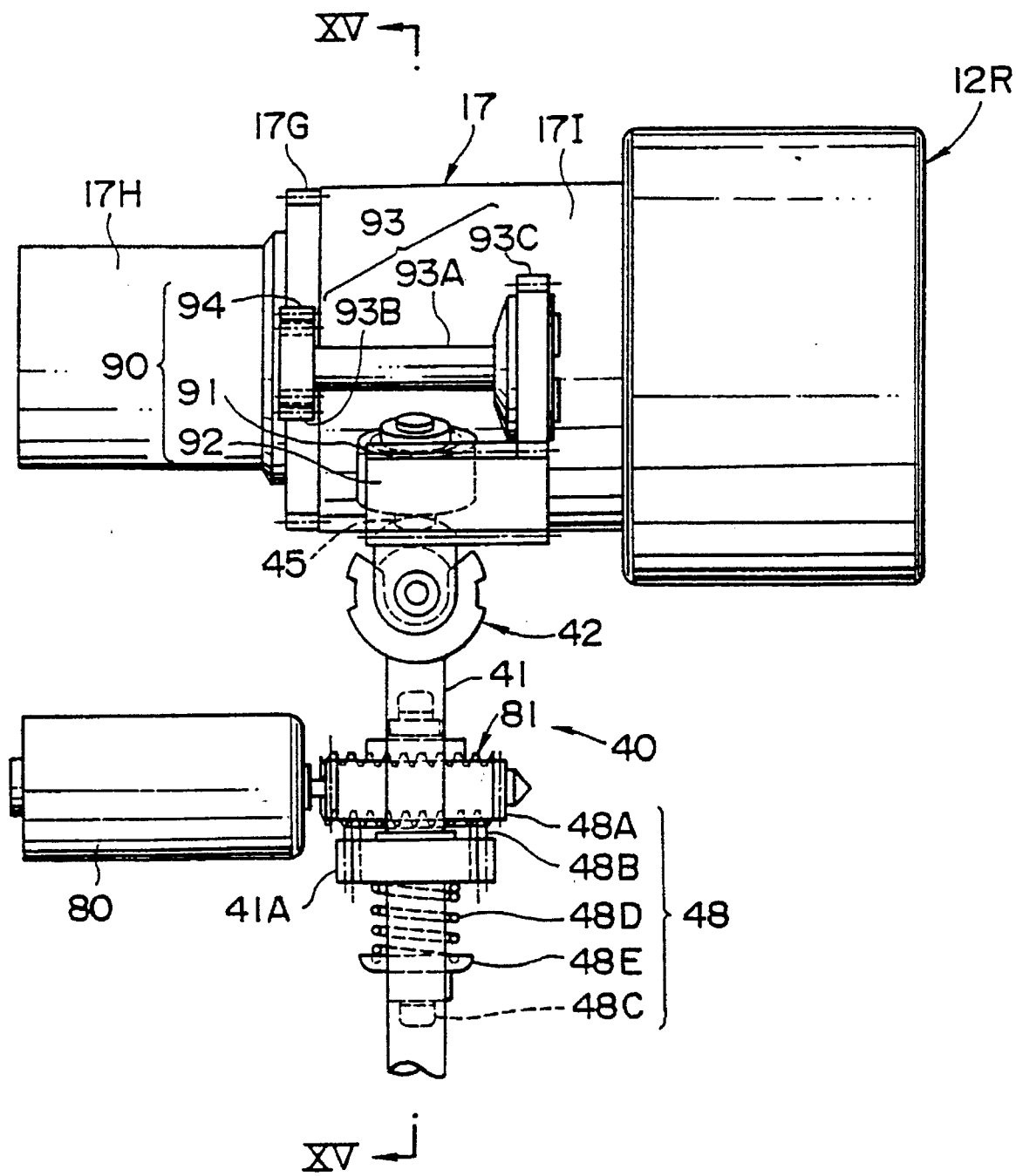
FIG. 14 is a plan view of a synchronous power varying mechanism in the binocular shown in FIG. 1.
Figure 15:
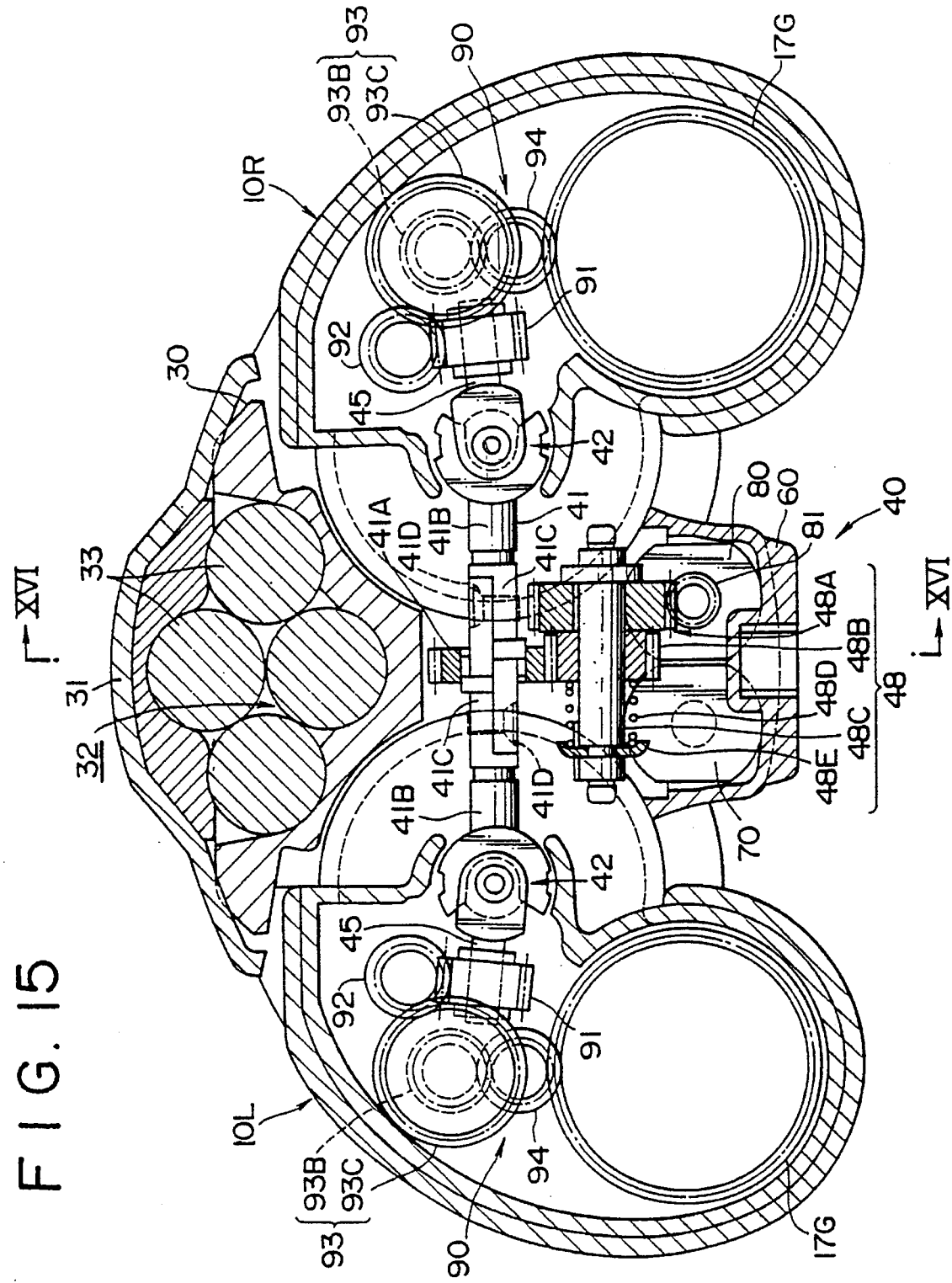
FIG. 15 is a cross-sectional view taken along line XV—XV of FIGS. 2 and 14.
Figure 16:
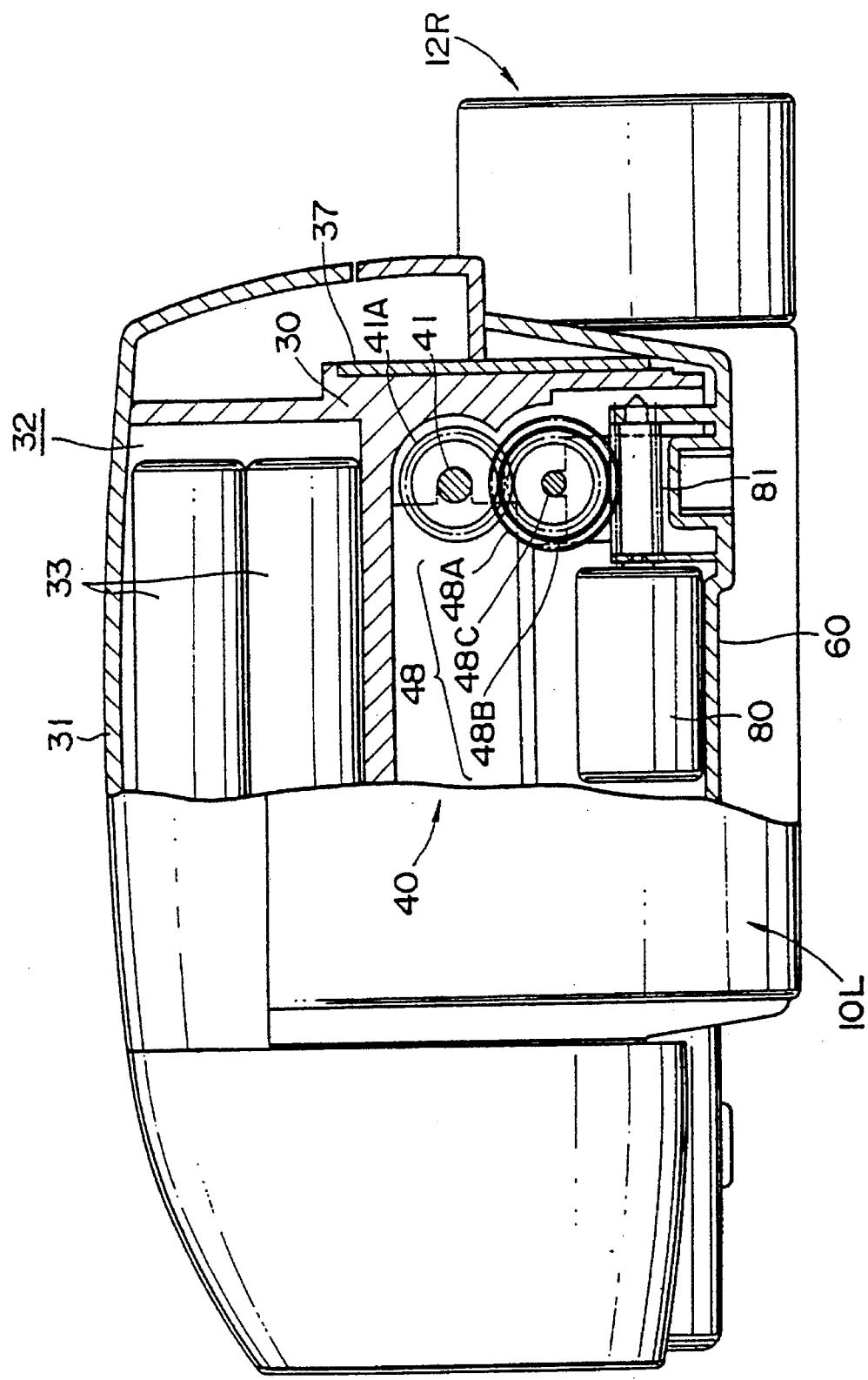
FIG. 16 is a fragmentary cross-sectional view taken alone line XVI—XVI of FIG. 15.

As shown in FIGS. 14, 15, and 16, the synchronous power varying mechanism 40 has a joint shaft 41 rotatably supported in a rear portion of the central support 30 and extending transversely to the optical axes OA of the objectives 11. End shafts 45 are operatively coupled to the respective outer ends of the joint shaft 41 through respective hook-type universal joints 42 whose central positions are aligned with the respective optical axes OA. The end shafts 45 are operatively connected to the spur gears 17G of the power-varying lens barrels 17 through gear trains 90.

The joint shaft 41 is composed of a pair of shaft members 41B having respective semicylindrical end portions 41C which are complementarily fastened to each other by screws 41D. The joint shaft 41 supports a spur gear 41A on its longitudinally central portion.

As described above, the central positions of the universal joints 42 are aligned with the optical axes OA of the objectives 11, around which the telescopic optical systems 10L, 10R are angularly movable. Therefore, any angular movement of the telescopic optical systems 10L, 10R about the optical axes OA for interpupillary adjustment is allowed by the universal joints 42 when the angle of the end shafts 45 with respect to the joint shaft 41 varies. At the same time, rotational forces can be transmitted from the joint shaft 41 to the end shafts 45 through the universal joints 42. The angles of the universal joints 42, i.e., the angles at which the end shafts 45 are inclined to the joint shaft 41, are equal to each other because the angular movements of the telescopic optical systems 10L, 10R are synchronized by the intermeshing sets of gear teeth 15B (see FIG. 6).

The joint shaft 41 is positioned above a friction clutch gear assembly 48 composed of a larger-diameter worm wheel 48A and a smaller-diameter spur gear 48B coaxial therewith, and having a gear shaft 48C rotatably supported by the central support 30 parallel to the joint shaft 41. The spur gear 48B is held in mesh with the spur gear 41A on the joint shaft 41. The worm wheel 48A is held in mesh with a worm 81 fixedly mounted on the spindle of a power varying motor 80 that is located next to the focusing motor 70 in juxtaposed relationship underneath the central support 30 below the batteries 33. The power varying motor 80 is electrically connected to the batteries 33 through the magnification control switch 36. The power varying motor 80 is disposed on the upper surface of the lower cover 60 beneath the central support 30, with the spindle thereof extending parallel to the optical axis OA toward the eyepiece assemblies 12L, 12R.

The gear shaft 48C is fixed to the worm wheel 48A, and the spur gear 48B is rotatably fitted over the gear shaft 48C. The spur gear 48B is frictionally pressed against one side of the worm wheel 48A by a compression-coil spring 48D disposed under compression around the gear shaft 48C between a retaining ring 48E mounted on the gear shaft 48C and the spur gear 48B. The worm wheel 48A and the spur gear 48B rotate in unison with each other due to friction therebetween, i.e., the torque produced by the power varying motor 80 is transmitted from the worm wheel 48A to the spur gear 48B, until reactive forces from the joint shaft 41 reach a predetermined level. When the reactive forces from the joint shaft 41 exceed the predetermined level, the worm wheel 48A rotates idly with respect to the spur gear 48B, i.e., no torque is transmitted from the worm wheel 48A to the spur gear 48B.

As shown in FIGS. 14 and 15, the gear train 90 operatively coupled between each of the end shafts 45 and the corresponding spur gear 17G has a worm 91 mounted nonrotatably but axially movable on the end shaft 45, and a worm wheel 92 in the form of a helical gear positioned above the worm 91 in mesh therewith. The gear train 90 also includes a clutch gear assembly 93 comprising a smaller-diameter spur gear 93B mounted on one end of a shaft 93A and a larger-diameter helical gear 93C mounted on the other end of the shaft 93A, the larger-diameter helical gear 93C meshing with the helical-gear worm wheel 92. The smaller-diameter spur gear 93B meshes with an idler gear 94 which is in turn held in mesh with the spur gear 17G of the power-varying lens barrel 17. The above gear train 90, which is composed of the worm 91, the helical-gear wheel 92, the clutch gear assembly 93, and the idler gear 94, is housed in the prism chamber 15 near the eyepiece assembly. The gear trains 90 in the respective telescopic optical systems 10L, 10R are symmetrically arranged with respect to the central axis of the binocular, and the worms 91 of the gear trains 90 have threads of the same hand, i.e., are either left- or right-handed.

More specifically, the screwing direction of one of worms 91 (or worm wheels 92) is set to be opposite to that of the other of worms 91 (or worm wheels 92). Accordingly, the left and right clutch gear assemblies 93 are rotated in the same direction upon the rotation of the motor 80. Thus, the left and right lens barrels are formed so as to be identical, thereby enabling a cost reduction, while precisely maintaining the accuracy of the cam grooves of the respective left and right barrels. As a result, accurate coincidence of the respective right and left magnifications can be accomplished.

Figure 17A:
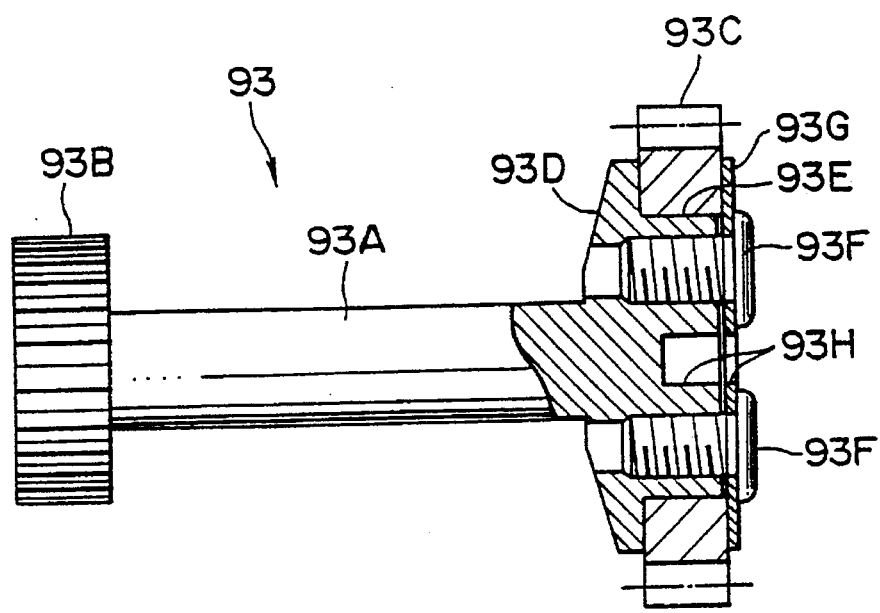
FIG. 17A is an enlarged side elevational view, partly in cross section, of a clutch gear assembly of the synchronous power varying mechanism shown in FIG. 14.
Figure 17B:
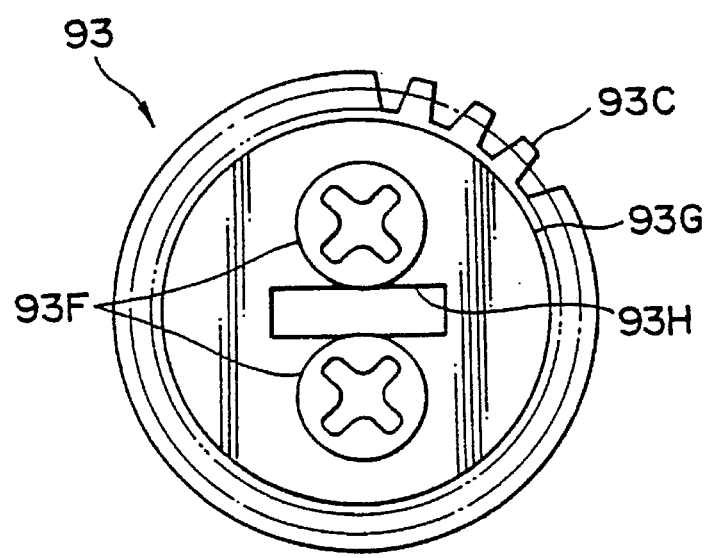
FIG. 17B is an enlarged front elevational view of the clutch gear assembly shown in FIG. 17A.

As illustrated in FIGS. 17A and 17B, each of the clutch gear assemblies 93 has a retainer flange 93D mounted on the end of the shaft 93A remotely from the gear 93B. The retainer flange 93D has a central axial projection 93E of circular cross section which extends away from the gear 93B. The larger-diameter gear 93C, which is of an annular shape, is fitted over the central axial projection 93E and nonrotatably retained thereon by a retainer plate 93G that is fastened to the outer end surface of the central axial-projection 93E by a pair of screws 93F. When the screws 93F are loosened, the larger-diameter gear 93C can be rotated relatively to the retainer flange 93D. The retainer plate 93G and the retainer flange 93D jointly have a central slot 93H for receiving the blade of a slotted-head screwdriver.

When the power varying motor 80 is energized upon pressing the magnification control switch 36, the worm 81 is rotated to cause the worm wheel 48A and the gears 48B, 41A to rotate the joint shaft 41. The rotation of the joint shaft 41 is transmitted through the universal joints 42 and the end shafts 45 to the gear trains 90, which then rotate the power-varying lens barrels 17 of the telescopic optical systems 10L, 10R. Since the worms 91 of the gear trains 90 are of the same hand, the power-varying lens barrels 17 are rotated in the same direction synchronously with each other. Therefore, the magnifications of the telescopic optical systems 10L, 10R are continuously varied in synchronism with each other.

For interpupillary adjustment, the telescopic optical systems 10L, 10R are turned about the respective optical axes OA to vary the distance between the eyepiece assemblies 18. Regardless of the angle through which the telescopic optical systems 10L, 10R are turned about the respective optical axes OA, the universal joints 42 aligned with the respective optical axes OA can transmit the rotation of the joint shaft 41 to the gear trains 90 for synchronously varying the magnifications of the telescopic optical systems 10L, 10R. Even if the angular velocity of the joint shaft 41 is constant, the angular velocities of the end shafts 45 or the worms 91 vary depending on the angle of the universal joints 42 between the joint shaft 41 and the end shafts 45. However, since the telescopic optical systems 10L, 10R are turned about the respective optical axes OA through the same angle, the angular velocities of the end shafts 45 or the worms 91 vary to the same extent for the telescopic optical systems 10L, 10R. Consequently, irrespective of the angular positions to which the telescopic optical systems 10L, 10R are turned for interpupillary adjustment, the magnifications of the telescopic optical systems 10L, 10R are variable fully in synchronism with each other.

While the power varying motor 80 is being energized to vary the magnification of each of the telescopic optical systems 10L, 10R, it is possible for the telescopic optical systems 10L, 10R to reach an end of the allowable range of variable magnifications, i.e., for the guide pins 17E, 17F to reach the ends of the cam grooves 17C, 17D. When the guide pins 17E, 17F reach the ends of the cam grooves 17C, 17D, large reactive forces are applied from the joint shaft 41 to the spur gear 48B. Therefore, the worm wheel 48A is rotated idly with respect to the spur gear 48B in sliding contact therewith by the power-varying motor 80.

Accordingly, no excessive forces are exerted from the power varying motor 80 to the lens systems 17A, 17B, the guide pins 17E, 17F, the power-varying lens barrels 17, the gear trains 90, the universal joints 42, and other associated components which are thus prevented from being damaged.

With the variable-power binocular, it is necessary that the magnifications of the telescopic optical systems 10L, 10R be equalized to each other. Manual adjustments to equalize the magnifications of the telescopic optical systems 10L, 10R are carried out as follows: First, the screws 93F (see FIGS. 17A and 17B) are loosened to make the larger- and smaller-diameter gears 93C, 93B rotatable relative to each other. Then, the blade of a slotted-head screwdriver is inserted into the slot 93H, and manually turned to rotate the retainer flange 93D, the shaft 93A, and the smaller-diameter gear 93B for turning the spur gear 17G of the power-varying lens barrel 17. At this time, inasmuch as the larger-diameter gear 93C is rotatable relative to the retainer flange 93D, the power-varying lens barrel 17 is disconnected from the power varying motor 80. Accordingly, the power-varying lens barrel 17 can be manually turned independently of the power varying motor 80. In this manner, the magnifications of the telescopic optical systems 10L, 10R can be manually adjusted independently of each other so that they are equalized. After the spur gear 17G, and hence the power-varying lens barrel 17, have been turned to a desired angle position, the screws 93F are tightened to fasten the gears 93C, 93B to each other.

As described above, the focus adjustment and the magnification, or power, adjustment of the telescopic optical systems 10L, 10R are achieved by the motors 70, 80, respectively. Therefore, the user of the binocular finds it quite easy to adjust the focus and vary the magnification of the binocular, and does not need substantial manual forces for the focus and magnification adjustments.

The motors 70, 80 are positioned beneath the central support 30, i.e., on one side of a plane containing the optical axes OA of the objectives 11, and the batteries 33 for energizing the motors 70, 80 are positioned in an upper portion of the central support 30, i.e., on the other side of the plane. The binocular with such a motor and battery layout may be relatively small in size.

Since the power-varying lens barrels 17 of the telescopic optical systems 10L, 10R are structurally identical to each other, the cost of the binocular may be reduced. The speed reduction ratio of the synchronous power varying mechanism 40 may be increased to reduce any changes in the angular velocities of the end shafts 45 to a negligible extent.

FIGS. 18 through 26 illustrate a manually operated power-variable binocular according to a second embodiment of the present invention.

As shown in FIG. 18, the binocular comprises a pair of left and right parallel telescopic optical systems 110L, 110R each comprising Porro prisms as an erecting prismatic system, an objective 111 having an optical axis OA, and an eyepiece assembly 112L or 112R whose optical axis is laterally displaced from, or eccentric with respect to, the optical axis OA. The binocular also has a joint retainer 120 which interconnects the objectives 111. The telescopic optical systems 110L, 110R are spaced from each other and supported parallel to each other by the joint retainer 120. The optical axes of the eyepiece assemblies 112L, 112R are spaced a greater distance from each other than the optical axes OA are spaced from each other.

The telescopic optical systems 110L, 110R have respective objective barrels 113L, 113R housing the respective objectives 111. The objective barrels 113L, 113R are coupled to the eyepiece assemblies 112L, 112R, respectively, through respective prism chambers 115 which accommodate the Porro prisms therein. Two rear plates 116 are secured respectively to the prism chambers 115 at front ends of the eyepiece assemblies 112L, 112R.

The objective barrels 113L, 113R are rotatably fitted in respective parallel holes 121L, 121R defined in the joint retainer 120 in laterally spaced-apart relationship to each other.

Figure 19:
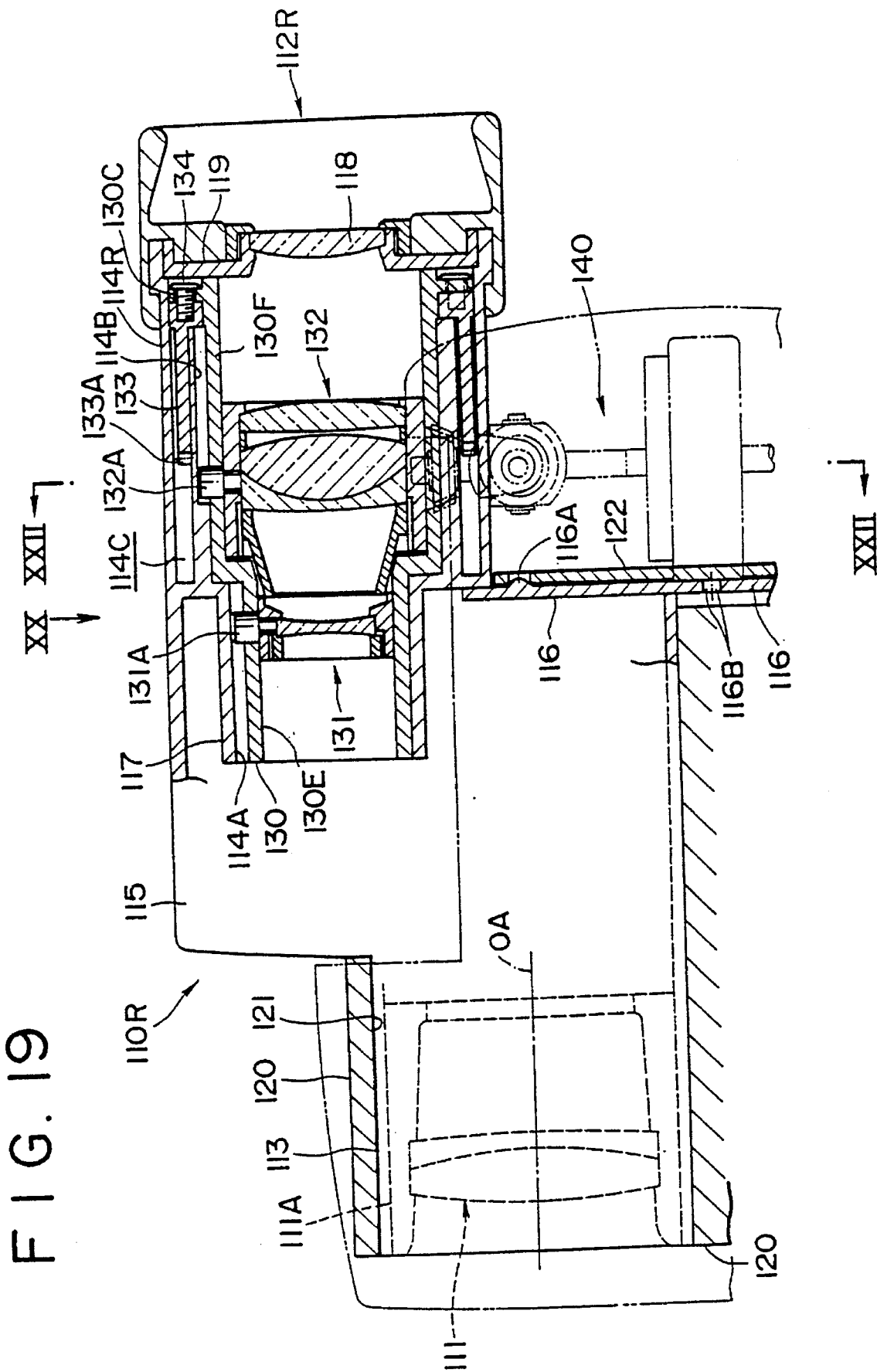
FIG. 19 is an enlarged fragmentary cross-sectional view of an eyepiece assembly of the binocular shown in FIG. 18, with a power-varying lens barrel which houses lens systems.

As shown in FIGS. 18 and 19, the rear plates 116 have substantially hemispherical projections 116A, respectively, on their rear surface near the eyepiece assemblies 112L, 112R, in alignment with the optical axes OA. The projections 116A are pressed and supported in place by a holder plate 122, but allowed to rotate about the optical axes OA, respectively. Therefore, the telescopic optical system 110L, 110R are angularly movable about the optical axes OA, respectively.

The rear plates 116 have respective intermeshing sets of gear teeth 116B on arcuate confronting edges thereof remote from the projections 116A, the arcuate confronting edges extending around the optical axes OA. The sets of gear teeth 116B are defined in certain angular intervals around the optical axes OA. The intermeshing engagement of the sets of gear teeth 116B allows the telescopic optical systems 110L, 110R to turn through equal angles about the respective optical axes OA in ganged relationship to each other thereby to vary the distance between the eyepiece assemblies 112L, 112R for interpupillary adjustment.

The objective barrels 113L, 113R accommodate therein respective lens frames 111L, 111R which hold the respective objectives 111. The lens frames 111L, 111R are axially movable a certain distance along the respective optical axes OA in the objective barrels 113L, 113R. When the lens frames, 111L, 111R are moved along the optical axes OA by a focusing mechanism (not shown), the telescopic optical systems 110L, 110R are adjusted to focus the image formed by the objective lenses 111.

Figure 20:
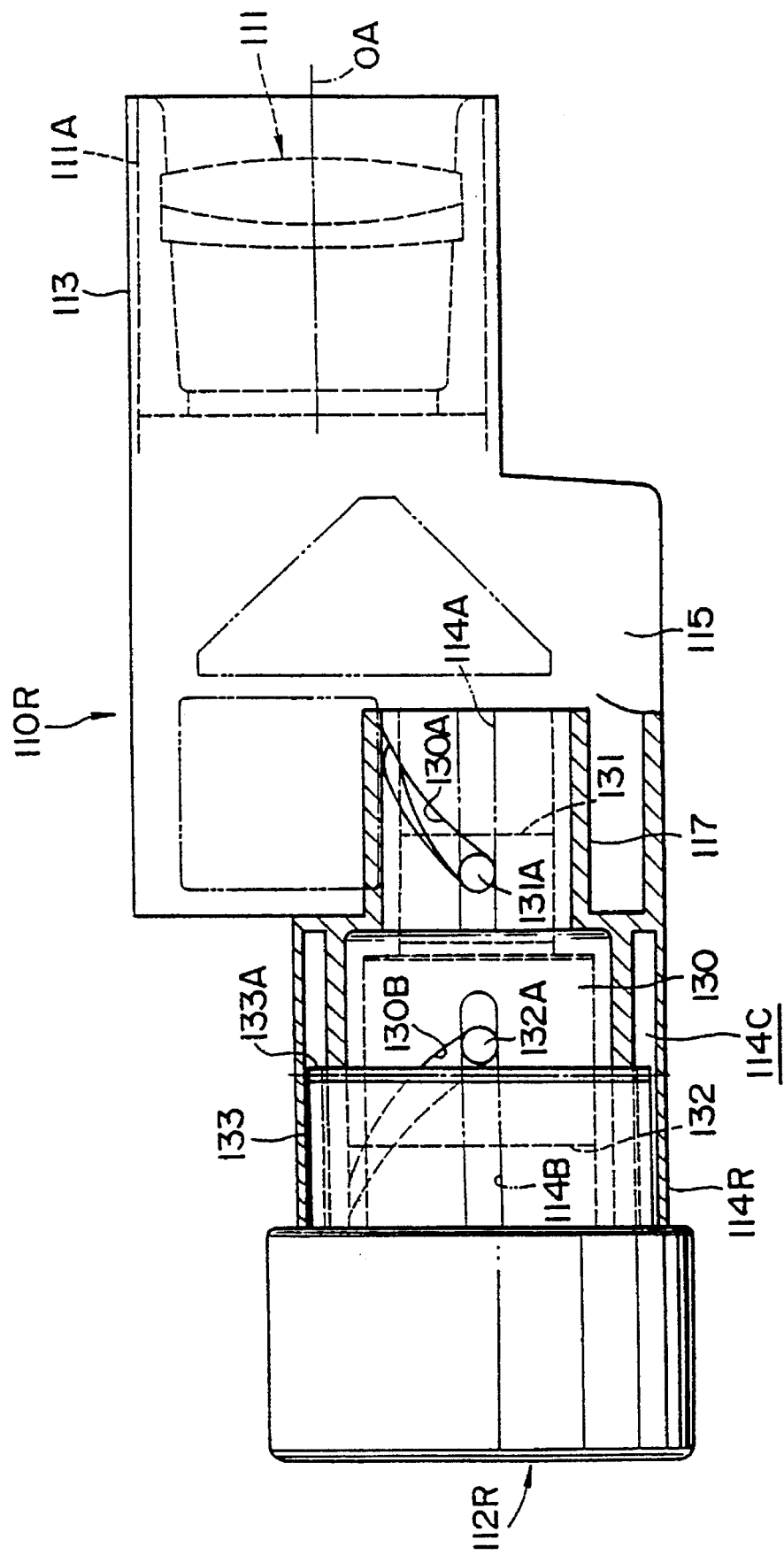
FIG. 20 is a side elevational view, partly in cross section, of a telescopic optical system as viewed in the direction indicated by the arrow XX in FIG. 19.

As shown in FIGS. 19 and 20, the eyepiece assembly 112R includes an eyepiece barrel 114R joined to the prism chamber 115 of the telescopic optical system 110R. A power-varying lens barrel 130 (see FIG. 21) is rotatably fitted in the eyepiece barrel 114R and has an outer end which is held by an eyepiece frame 119 supporting an eyepiece 118. The eyepiece frame 119 is fixed to the outer end of the eyepiece barrel 114R. The eyepiece barrel 114R includes a smaller-diameter holder sleeve 117 disposed in the prism chamber 115 and extending toward the objective 111.

The power-varying lens barrel 130 is in the form of a double cylinder including a smaller-diameter cylindrical portion 130E extending toward the objective 111 and a larger-diameter cylindrical portion 130F. The power varying lens barrel 130 houses a lens system 131 of negative power supported in the smaller-diameter cylindrical portion 130E and a lens system 132 supported in the larger-diameter cylindrical portion 130F. These lens systems 131, 132 are axially movable respectively in the smaller- and larger-diameter cylindrical potions 130E, 130F for movement along the optical axis of the eyepiece 118.

The smaller-diameter cylindrical portion 130E has a helical cam groove 130A defined in its cylindrical wall which extends helically around the optical axis of the eyepiece 118. Likewise, the larger-diameter cylindrical portion 130F has a helical cam groove 130B defined in its cylindrical wall which extends helically around the optical axis of the eyepiece 118. The lens system 131 has a guide pin 131A mounted on its lens frame and extending radially outwardly through the cam groove 130A into an axially straight guide groove 114A defined in the inner circumferential surface of the holder sleeve 117. The lens system 132 has a guide pin 132A mounted on its lens frame and extending radially outwardly through the cam groove 130B into an axially straight guide groove 114B defined in the inner circumferential surface of the eyepiece barrel 114R. The cam grooves 130A, 130B and the guide 114A, 114B are of such a size that they allow the guide pins 131A, 132A, to move smoothly in these grooves 130A, 130B, 114A, 114B. Therefore, when the power-varying lens barrel 130 is rotated about its own axis, the guide pins 131A, 132A which engage in both the cam grooves 130A, 130B and the guide grooves 114A, 114B move along the optical axis of the eyepiece 118, thereby moving the lens systems 131, 132 axially in the smaller- and larger-diameter cylindrical portions 130E, 130F, respectively.

More specifically, if it is assumed that the lens systems 131, 132 are initially positioned most closely to each other as shown in FIG. 19, when the power-varying lens barrel 130 is rotated clockwise as viewed from the eyepiece 118, the lens system 131 is axially moved toward the objective 111, and the lens system 132 is axially moved toward the eyepiece 118 for continuously varying the magnification or power of the telescopic optical system 110R without shifting the formed image out of focus.

Figure 21:
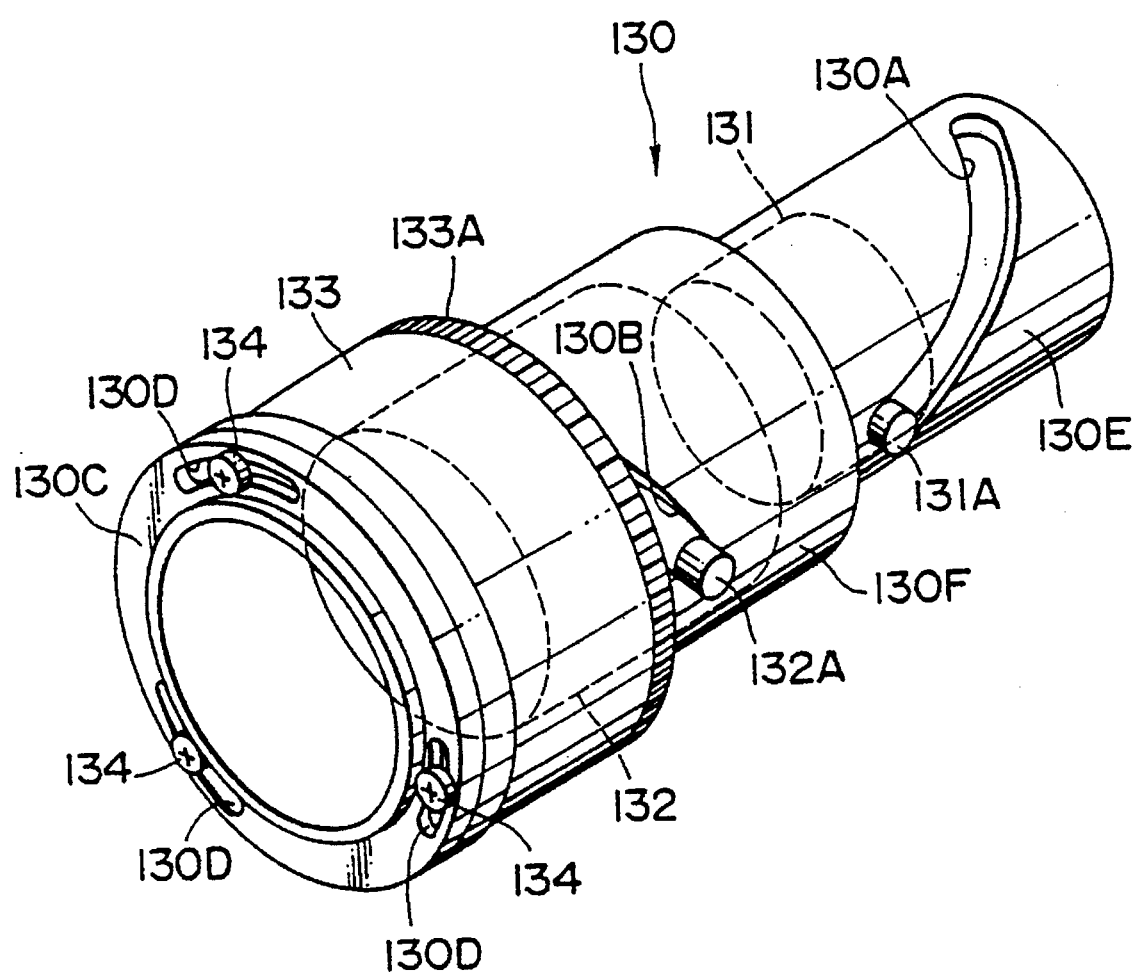
FIG. 21 is a perspective view of a power-varying lens barrel in the telescopic optical system shown in FIG. 20.

As shown in FIGS. 19 and 21, the power-varying lens barrel 130 has an annular flange 130C extending radially outwardly from an outer end of the larger-diameter cylindrical portion 130F near the eyepiece frame 119. A ring gear 133 is angularly movably disposed around the power-varying lens barrel 130 and has axial gear teeth 133a on an axial end thereof remote from the flange 130C. The ring gear 133 is adjustably fastened, at its axial end remote from the gear teeth 133a, to the flange 130C by a plurality of axial screws 134. The axial screws 134 extend axially through respective arcuate slots 130D defined at angularly spaced intervals in the flange 130C, and are threaded into the axial end of the ring gear 133. When the screws 134 are loosened, therefore, the ring gear 133 can be angularly adjusted with respect to the flange 130C and hence, the power-varying lens barrel 130. The eyepiece frame 119 has a plurality of holes (not shown) defined therein in alignment with the respective arcuate slots 130D for the insertion of a screwdriver blade to access and turn the screws 134.

Referring to FIG. 19, the eyepiece barrel 114R is of a double-walled structure having an annular space 114C defined therein which axially opens toward the eyepiece frame 119. The ring gear 133 fastened to the flange 130C and extending around the larger-diameter cylindrical portion 130F of the power-varying lens barrel 130 is loosely disposed in the annular space 114C.

The other eyepiece assembly 112L of the telescopic optical system 110L, including an eyepiece barrel and a power-varying lens barrel with lens systems, is identical in structure to the eyepiece assembly 112R, and will not be described in detail. The eyepiece assemblies 112L, 112R are symmetrically arranged with respect to the central axis of the binocular.

The magnifications of the telescopic optical systems 110L, 110R can be varied in synchronism with each other, i.e., the power-varying lens barrels 130 thereof can be rotated in ganged relationship to each other, by the synchronous power-varying mechanism 140. The synchronous power-varying mechanism 140 is positioned on the side of the holder plate 144 closer to the eyepiece assemblies 112L, 112R.

Figure 22:
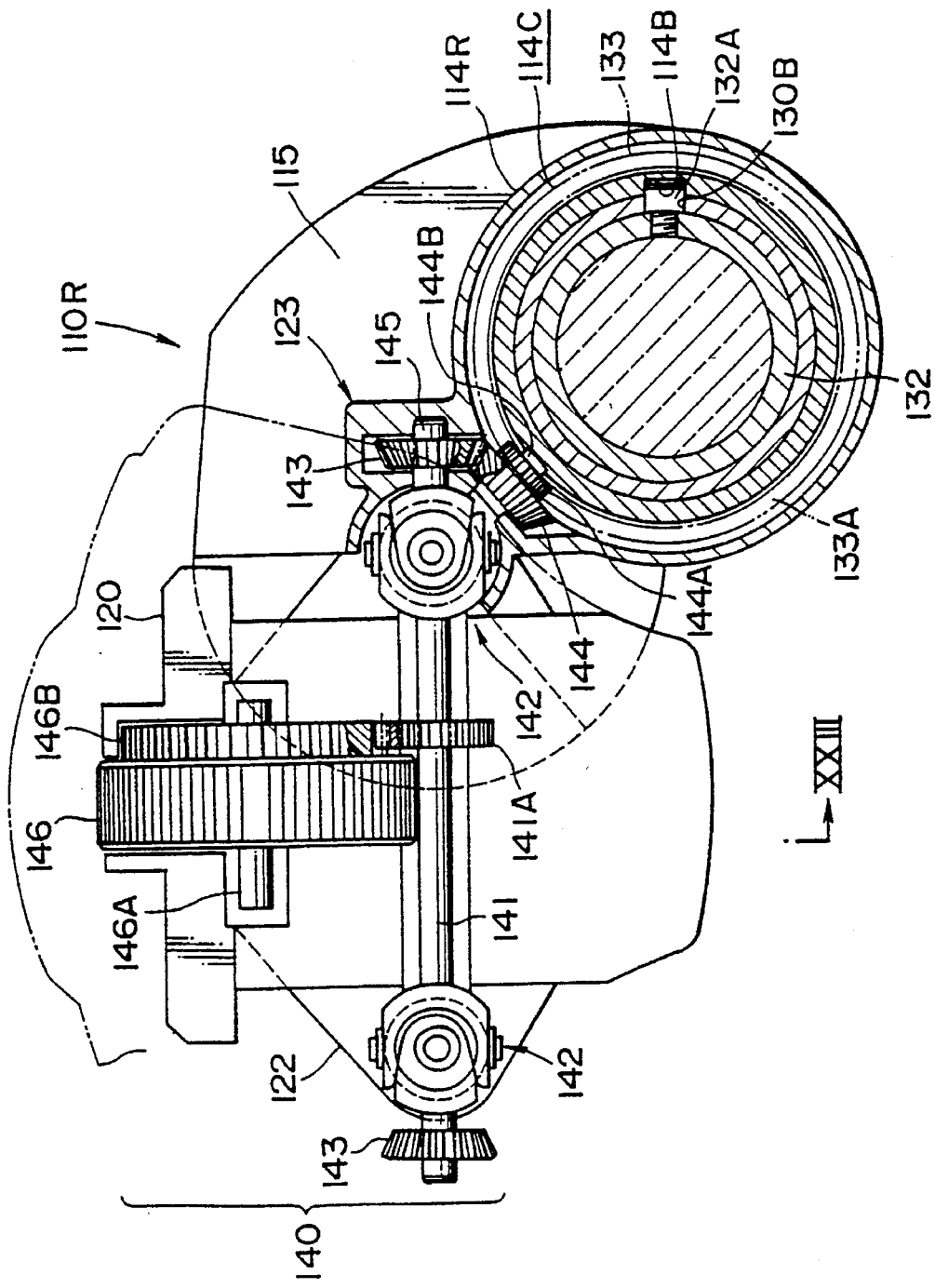
FIG. 22 is a cross-sectional view taken along line XXII—XXII of FIG. 19.

As shown in FIGS. 18, 19, and 22, the synchronous power-varying mechanism 140 has a joint shaft 141 rotatably supported on a rear portion of the Joint retainer 120 and extending transversely to the optical axes OA of the objectives 111. End shafts 145 are operatively coupled to the respective outer ends of the joint shaft 141 through respective hook-type universal joints 142 whose central positions are aligned with the respective optical axes OA. The end shafts 145 are operatively connected to the ring gears 133 on the power-varying lens barrels 130 through a train of first and second bevel gears 143, 144 which are rotatably supported in the eyepiece barrels 114L, 114R.

In the eyepiece barrel 114R, the first bevel gear 143 is nonrotatably but axially movably supported on the end shaft 145 which is rotatably supported in a gearbox 123 that is integral with and projects radially outwardly from the eyepiece barrel 114R. The second bevel gear 144, which includes a spur gear 144A mounted on one side thereof, has a shaft 144B rotatably supported between a side wall of the gearbox 123 and the inner cylindrical wall of the eyepiece barrel 114R. The second bevel gear 144 is held in mesh with the first bevel gear 143, and the spur gear 144A is positioned in the annular space 114C and held in mesh with the gear teeth 133A of the ring gear 133. The shaft 114B has its central axis extending perpendicularly to the optical axis OA of the objective 111 and the optical axis of the eyepiece assembly 112R.

The first and second bevel gears 143, 144 are arranged in the eyepiece barrel 114L in a layout similar to the above layout of the first and second bevel gears 143, 144 in the eyepiece barrel 114R. However, the first and second bevel gears 143, 144 in the eyepiece barrels 114R, 114L are symmetric with respect to the central axis of the binocular.

Inasmuch as the central positions of the universal joints 142 are aligned with the optical axes OA of the objectives 111, around which the telescopic optical systems 110L, 110R are angularly movable, any angular movement of the telescopic optical systems 110L, 110R about the optical axes OA for interpupillary adjustment is allowed by the universal joints 142 when the angle of the end shafts 145 with respect to the joint shaft 141 varies. At the same time, rotational forces can be transmitted from the joint shaft 141 to the end shafts 145 through the universal Joints 142. The angles of the universal joints 142, i.e., the angles at which the end shafts 145 are inclined to the joint shaft 141, are equal to each other because the angular movements of the telescopic optical systems 110L, 110R are synchronized by the intermeshing sets of gear teeth 116B.

Figure 23:
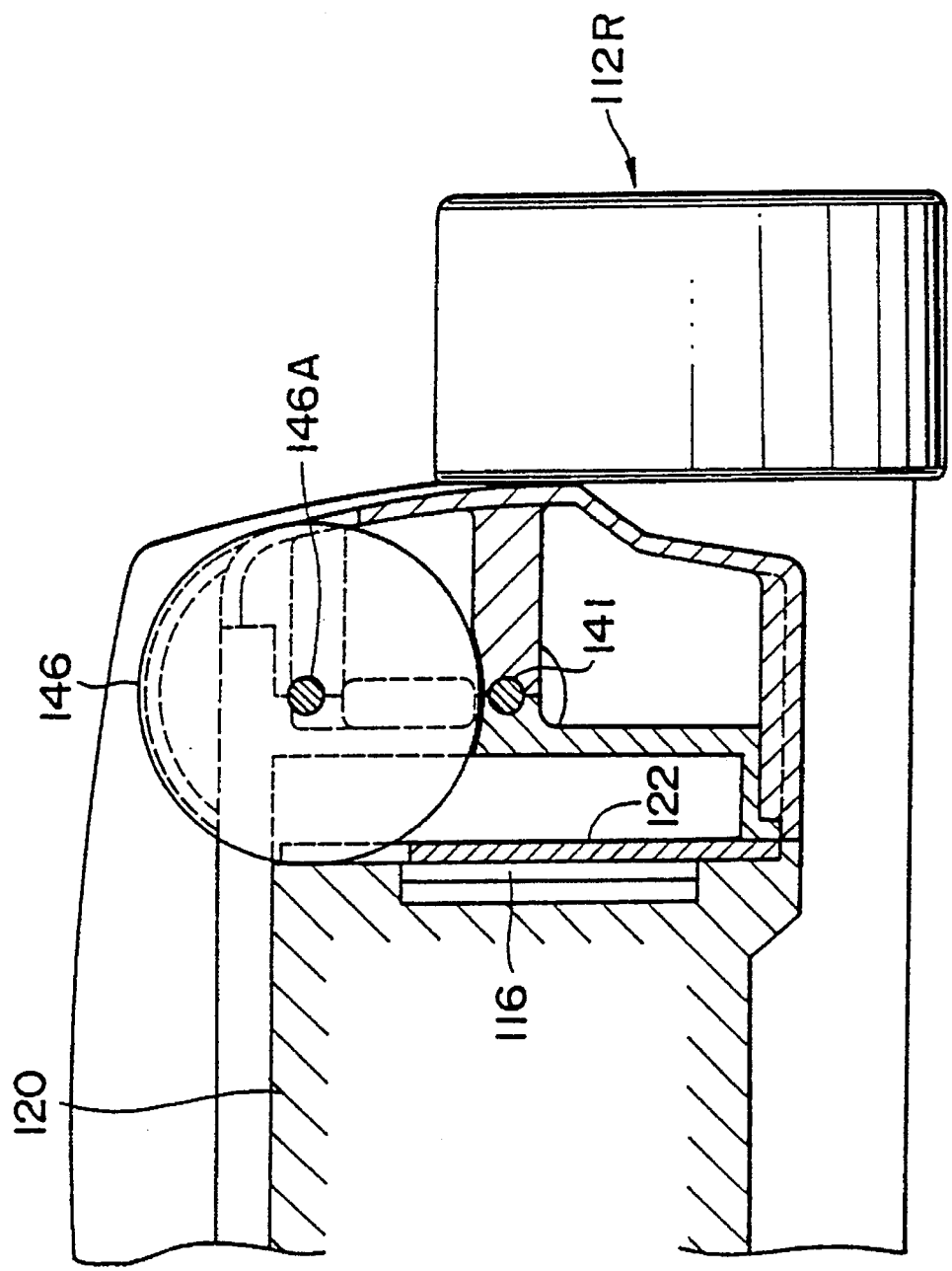
FIG. 23 is a cross-sectional view taken along line XXIII—XXIII of FIG. 22.

The joint shaft 141 supports a spur gear 141A on its substantially longitudinally central portion. The spur gear 141A is held in mesh with a spur gear 146B integrally joined to one side of a control wheel 146 which has a shaft 146A rotatably supported by the joint retainer 20 parallel to the joint shaft 141. The control wheel 146 has a knurled outer circumferential surface which is partly exposed for being accessed by the user as shown in FIG. 23. Therefore, when the control wheel 146 is manually turned by the user of the binocular, the joint shaft 141 is rotated about its own axis through the gears 146B, 141A.

When the control wheel 146 is manually turned by the user thereby to rotate the joint shaft 141, the rotation of the joint shaft 141 is transmitted through the universal joints 142 to the first and second bevel gears 143, 144 in the telescopic optical systems 110L, 110R. Since the gears 144A mesh with the gear teeth 133A, the power-varying lens barrels 130 of the telescopic optical systems 110L, 110R are rotated for thereby varying the magnifications of the telescopic optical systems 110L, 110R in synchronism with each other. The second bevel gears 144 in the telescopic optical systems 110L, 110R rotate in opposite directions, with the result that the power-varying lens barrels 130 of the telescopic optical systems 110L, 110R rotate in opposite directions. However, the magnifications of the telescopic optical systems 110L, 110R are varied in synchronism with each other as the power-varying lens barrels 130 thereof are symmetrical in arrangement.

To adjust the eyepiece assemblies 118 for a suitable interpupillary distance, the telescopic optical systems 110L, 110R are turned about the respective optical axes OA to vary the distance between the eyepiece assemblies 118 as shown in FIGS. 24 through 26. Regardless of the angle through which the telescopic optical systems 110L, 110R aye turned about the respective optical axes OA, the universal joints 42 aligned with the respective optical axes OA can transmit the rotation of the joint shaft 141 to the bevel gears 143, 144 for synchronously varying the magnifications of the telescopic optical systems 110L, 110R. Even if the angular velocity of the joint shaft 141 is constant, the angular velocities of the end shafts 145 vary depending on the angle of the universal joints 142 between the joint shaft 141 and the end shafts 145. However, since the telescopic optical systems 110L, 110R are turned about the respective optical axes OA through the same angle, the angular velocities of the end shafts 145 vary to the same extent for the telescopic optical systems 110L, 110R. Consequently, irrespective of the angular positions to which, the telescopic optical systems 110L, 110R are turned for interpupillary adjustment, the magnifications of the telescopic optical systems 110L, 110R are variable fully in synchronism with each other.

In the second embodiment, the telescopic optical systems 110L, 110R are angularly movable through 30 from the position shown in FIG. 24 to the position shown in FIG. 26. When the telescopic optical systems 110L, 110R are turned about the optical axes OA for an intermediate interpupillary distance as shown in FIG. 25, the end shafts 145 are aligned with the joint shaft 141. When the telescopic optical systems 110L, 110R are turned about the optical axes OA for a maximum interpupillary distance as shown in FIG. 24, the end shafts 145 are inclined 15° to the joint shaft 141. When the telescopic optical systems 110L, 110R are turned about the optical axes OA for a minimum interpupillary distance as shown in FIG. 26, the end shafts 145 are also inclined 15° to the joint shaft 141, but in an opposite direction.

The magnifications of the telescopic optical systems 110L, 110R can be equalized to each other through manual adjustments. Specifically, in each of the telescopic optical systems 110L, 110R, the screws 134 (see FIGS. 19 and 21) are loosened to allow the power-varying lens barrel 130 to be angularly displaced with respect to the ring gear 133. Then, the power-varying lens barrel 130 is angularly displaced to a desired angular position relative to the ring gear 133, after which the screws 134 are tightened. The magnifications of the telescopic optical systems 110L, 110R can thus be manually adjusted independently of each other so that they are equalized. The power-varying lens barrel 130 may be angularly adjusted with respect to the ring gear 133 for an angular range within the length of the arcuate slots 130D.

FIGS. 27 through 33 show a motor-driven power-variable binocular according to a third embodiment of the present invention. Those parts of the binocular shown in FIGS. 27 through 33 which are identical to those shown in FIGS. 18 through 26 are denoted by identical reference characters, and will not be described in detail below.

The binocular according to the third embodiment is basically a modification of the binocular according to the second embodiment, with the addition of a motor-driven synchronous power-varying mechanism for varying the magnifications of the telescopic optical systems. The motor-driven synchronous power-varying mechanism according to the third embodiment is essentially the same as the synchronous power varying mechanism according to the first embodiment.

As shown in FIG. 27, the larger-diameter cylindrical portion 130F of the power-varying lens barrel 130 of the telescopic optical system 110R has a spur gear 130G on its outer circumferential surface near the smaller-diameter cylindrical portion 130E. The power-varying lens barrel of the other telescopic optical system 110L (see FIGS. 31 through 33) is identical in structure to the power-varying lens barrel 130 of the telescopic optical system 110R.

As shown in FIGS. 28 and 29, a synchronous power varying mechanism 170 has a joint shaft 171 rotatably supported by the joint holder 120 and extending transversely to the optical axes OA of the objectives 111. End shafts 175 (see also FIGS. 31, 32, and 33) are, operatively coupled to the respective outer ends of the joint shaft 171 through respective hook-type universal joints 172 whose central positions are aligned with the respective optical axes OA. The end shafts 145 are operatively connected to the spur gears 130G of the power-varying lens barrels 130 through gear trains 150. The joint shaft 171 supports a spur gear 171A on its substantially longitudinally central portion.

The joint shaft 171 is positioned above a gear assembly 177 composed of a larger-diameter worm wheel 177A and a smaller-diameter spur gear 177B coaxial therewith, and having a gear shaft 178 rotatably supported by the joint retainer 120 parallel to the joint shaft 171. The spur gear 177B is held in mesh with the spur gear 171A on the joint shaft 171. The worm wheel 177A is held in mesh with a worm 161 fixedly mounted on the spindle of a power varying motor 160 that is located in a lower portion of the joint retainer 120. The power varying motor 160 is electrically connected to batteries (not shown) through a magnification control switch (not shown). The spindle of the power varying motor 160 extends parallel to the optical axis OA.

As shown in FIGS. 28, 31 through 33, the gear train 150 operatively coupled between each of the end shafts 175 and the corresponding spur gear 130G has a worm 151 mounted nonrotatably but axially movably on the end shaft 175, and a worm wheel 152 in the form of a helical gear positioned above the worm 151 in mesh therewith. The gear train 150 also includes a clutch gear assembly 153 comprising a smaller-diameter spur gear 153B mounted on one end of a shaft 153A and a larger-diameter helical gear 153C mounted on the other end of the shaft 153A, the larger-diameter helical gear 153C meshing with the helical-gear worm wheel 152. The smaller-diameter spur gear 153B meshes with an idler gear 154 which is in turn held in mesh with the spur gear 130G of the power-varying lens barrel 130. The above gear train 150, which is composed of the worm 151, the helical-gear wheel 152, the clutch gear assembly 153, and the idler gear 154, is housed in the prism chamber 115 near the eyepiece assembly. The gear trains 150 in the respective telescopic optical systems 110L, 110R are symmetrically arranged with respect to the central axis of the binocular, and the worms 151 of the gear trains 150 have threads of the same hand.

As illustrated in FIGS. 30A and 30B, each of the clutch gear assemblies 153 has a retainer flange 153D mounted on the end of the shaft 153A remotely from the gear 153B. The retainer flange 153D has a central axial projection 153E of circular cross section which extends away from the gear 153B. The larger-diameter gear 153C, which is of an annular shape, is fitted over the central axial projection 153E and nonrotatably retained thereon by a retainer plate 153G that is fastened to the outer end surface of the central axial projection 153E by a pair of screws 153F. When the screws 153F are loosened, the larger-diameter gear 153C can be rotated relative to the retainer flange 153D. The retainer plate 153G and the retainer flange 153D jointly have a central slot 153H for receiving the blade of a slotted-head screwdriver.

When the power varying motor 160 is energized upon pressing the magnification control switch, the worm 161 is rotated to cause the worm wheel 177A and the gears 177B, 171A to rotate the joint shaft 171. The rotation of the joint shaft 171 is transmitted through the universal joints 172 and the end shafts 175 to the gear trains 150, which then rotate the power-varying lens barrels 130 of the telescopic optical systems 110L, 110R. Since the worms 151 of the gear trains 150 are of the same hand, the power-varying lens barrels 130 are rotated in the same direction synchronously with each other. Therefore, the magnifications of the telescopic optical systems 110L, 110R are continuously varied in synchronism with each other.

The telescopic optical systems 110L, 110R can be turned about the respective optical axes OA to vary the distance between the eyepiece assemblies 118 for interpupillary adjustment in the same manner as described above with respect to the binocular according to the second embodiment of the present invention.

The magnifications of the telescopic optical systems 110L, 110R can be independently equalized to each other As follows: First, the screws 153F (see FIGS. 30A and 30B) are loosened to make the larger- and smaller-diameter gears 153C, 153B rotatable relative to each other. Then, the blade of a slotted-head screwdriver is inserted into the slot 153H, and manually turned to rotate the retainer flange 153D, the shaft 153A, and the smaller-diameter gear 153B for turning the spur gear 130G of the power-varying lens barrel 130. At this time, inasmuch as the larger-diameter gear 153C is rotatable relative to the retainer flange 153D, the power-varying lens barrel 130 is disconnected from the power-varying motor 160. Accordingly, the power-varying lens barrel 130 can be manually turned independently of the power-varying motor 160. In this manner, the magnifications of the telescopic optical systems 110L, 110R can be manually adjusted independently of each other so that they are equalized. After the spur gear 130G, and hence the power-varying lens barrel 130, have been turned to a desired angle position, the screws 153F are tightened to fasten the gears 153C, 153B to each other.

Because no ring gears are employed, the eyepiece barrels of the telescopic optical systems 110L, 110R, according to the third embodiment, may be smaller in diameter than those of the second embodiment. Stated otherwise, if the diameter of the eyepiece barrels remains the same, then the eyepiece barrels of the telescopic optical systems 110L, 110R, according to the third embodiment, may accommodate eyepieces of larger diameter.

The present disclosure relates to subject matters contained in Japanese Patent Applications Nos. HEI 3-357930, filed on Dec. 26, 1991, and HEI 3-357931, filed on Dec. 26, 1991, and Japanese Utility Model Application Nos. HEI 4-18413, filed on Feb. 27, 1992, and HEI 4-23889, filed on Mar. 21, 1992, which are expressly incorporated herein by reference in their entireties.

What is claimed is:

1. A binocular comprising:

two telescope systems, said telescope systems having parallel respective optical axes, and each of said telescope systems having a movable lens group;

a focusing actuator for synchronously moving said movable lens groups, said focusing actuator comprising a focusing slider movable in a direction parallel to said optical axes and a focusing drive mechanism for driving said focusing slider in a direction parallel to said optical axes; and a manually operable diopter adjusting mechanism for moving one of said movable lens groups relative to an other of said movable lens groups, said manually operable diopter adjusting mechanism including a drive gear rotatable about an axis parallel to said optical axes, and a rack member slidably supported by a central body of said binocular;

wherein sliding of said rack member rotatably drives said drive gear to drive said manually operable diopter adjusting mechanism;

wherein said drive gear is slidable relative to said rack member in said direction parallel to said optical axes, and wherein a slidable portion of said manually operable diopter adjusting mechanism is supported by said focusing slider.

2. The binocular according to claim 1, wherein said slidable portion of said manually operable diopter adjusting mechanism is movable relative to said focusing slider and together with said focusing slider.

3. The binocular according to claim 2, wherein said slidable portion of said manually operable diopter adjusting mechanism comprises a diopter control arm, said diopter control arm being coupled to one of said movable lens groups; and said focusing slider comprises a focus control arm, wherein said focus control arm is coupled to the other of said movable lens groups.

4. The binocular according to claim 3, wherein said slidable portion of said manually operable diopter adjusting mechanism is coupled to said focusing slider via a drive screw supported by said focusing slider, and said slidable portion of said manually operable diopter mechanism moves relative to said focusing slider in response to a rotation of said drive screw, thereby moving said one of said movable lens groups relative to said other of said movable lens groups via said diopter control arm.

5. The binocular according to claim 4, wherein said drive screw moves said slidable portion of said manually operable diopter mechanism in said direction parallel to said optical axes together with said focusing slider in response to a movement of said focusing slider in said direction parallel to said optical axes, thereby moving both said movable lens groups together via said focus control arm and said diopter control arm.

6. The binocular according to claim 5, wherein said drive gear is coaxially mounted on said drive screw, and said coaxial drive gear rotates said drive screw.

7. The binocular according to claim 6, wherein said rack member and said drive gear both have spur teeth aligned in a direction parallel to said optical axis, wherein said spur teeth of said drive gear intermesh with said spur teeth of said rack member.

8. The binocular according to claim 7, wherein said coaxial drive gear meshes with said rack member throughout a full range of movement of said focusing slider supporting said drive screw.

9. The binocular according to claim 8, wherein said focusing drive mechanism comprises an electrical motor drive that moves said focusing slider in said direction parallel to said optical axes.

10. An adjusting mechanism for a binocular, comprising:

a pair of telescope systems having parallel optical axes;

a binocular body supporting said telescope systems;

an objective lens moving member for moving objective lenses of said telescope systems in the optical axis direction;

focus control drive means for driving said objective lens moving member to adjust focus of said telescope systems;

an engagement arm provided to said objective lens moving member for engaging one of said objective lenses to prevent relative movement between said objective lenses in the optical axis direction;

a feeding screw rotatably supported by said objective lens moving member, said feeding screw having a rotation axis extending parallel to said optical axis direction;

an engagement operating member for engaging a remaining one of said objective lenses and for engaging said feeding screw, said engagement operating member supported by said objective lens moving member; and a feeding screw rotating member for rotating and operating said feeding screw, said feeding screw rotating member provided on a fixed member on said binocular body.

11. The adjusting member according to claim 10, further comprising:

a gear, coaxially fixed to said feeding screw; and gear teeth provided on said feeding screw operating member, for engaging said gear;

wherein said feeding screw rotating member is slidably movable along said fixed portion of said binocular body in the direction of rotation of said feeding screw.

12. An adjusting mechanism for a binocular having a pair of telescope systems having parallel optical axes, a binocular body supporting the telescope systems, and an objective lens moving member for moving objective lenses of the telescope systems in the optical axis direction, said adjusting mechanism comprising:

a feeding screw rotatably supported by the objective lens moving member, said feeding screw having a rotation axis extending parallel to said optical axis direction;

an engagement operating member for engaging one of said objective lenses and engaging said feeding screw, said engagement operating member supported by the objective lens moving member;

a coaxial drive gear coaxially provided on said feeding screw; and control means for engaging said coaxial drive gear;

wherein movement of said control means in a direction substantially perpendicular to said optical axis direction rotatably drives said coaxial drive gear to drive said feeding screw, and said feeding screw in turn drives said engagement operating member in said optical axis direction to move said one of said objective lenses for diopter adjustment of the binocular.

13. The adjusting mechanism according to claim 12, wherein said control means comprise a rack intermeshing with gear teeth of said coaxial drive gear.

14. The adjusting mechanism according to claim 13, wherein said control means further comprise a control member, said rack being slidably supported by a lower portion of the binocular body, and said control member being fixed to said rack through an opening in the lower portion of the binocular body.

15. The adjusting mechanism according to claim 13, wherein said adjusting mechanism further comprises:

focus control drive means for driving the objective lens moving member to adjust focus of the telescope systems; and an engagement arm for engaging the other of the objective lenses to prevent relative movement between the objective lenses in the optical axis direction during focus adjustment;

wherein said coaxial drive gear moves in said optical axis direction during focus adjustment and said rack remains fixed in said optical axis direction during focus adjustment; and wherein said rack and said gear teeth of said coaxial gear respectively comprise gear teeth which extend in said optical axis direction so that said rack and said coaxial gear remain intermeshed at any focus adjustment position of the binocular, wherein dioptric adjustment through said control means can be performed at any focus adjustment position of the binocular.

16. The adjusting mechanism according to claim 12, wherein said adjusting mechanism further comprises:

focus control drive means for driving the objective lens moving member to adjust focus of the telescope systems; and an engagement arm for engaging the other of the objective lenses to prevent relative movement between the objective lenses in the optical axis direction during focus adjustment.

* * * * *